United States Patent
Mikawa

(10) Patent No.: US 8,570,346 B2
(45) Date of Patent: Oct. 29, 2013

(54) IMAGE DISPLAY CONTROL APPARATUS AND IMAGE DISPLAY CONTROL METHOD

(75) Inventor: Chiaki Mikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1214 days.

(21) Appl. No.: 12/205,365

(22) Filed: Sep. 5, 2008

(65) Prior Publication Data

US 2009/0066730 A1 Mar. 12, 2009

(30) Foreign Application Priority Data

Sep. 6, 2007 (JP) ................................. 2007-231499

(51) Int. Cl.
*G09G 5/00* (2006.01)

(52) U.S. Cl.
USPC ............ 345/661; 345/667; 345/671; 345/629

(58) Field of Classification Search
USPC ......... 345/661, 665, 668, 671, 660, 667, 629; 348/333.11, 231.3; 715/784
See application file for complete search history.

(56) References Cited

U.S. PATENT DOCUMENTS 4,751,507 A * 6/1988 Hama et al. ................... 715/784
2006/0038908 A1 2/2006 Yoshino

FOREIGN PATENT DOCUMENTS

| EP | 1738687 A1 | 1/2007 |
| JP | 5-274417 A | 10/1993 |
| JP | 2004-201242 A | 7/2004 |
| JP | 2006-60387 A | 3/2006 |

* cited by examiner

*Primary Examiner* — Chante Harrison
(74) *Attorney, Agent, or Firm* — Canon USA, Inc., IP Division

(57) ABSTRACT

At the time of switching an image to be displayed from a first image to a second image with different number of recording pixels with the display scale fixed, display is controlled such that of a partial range displayed in a display region of the image, a relative position of a point farthest from the center of the first image, as to the first image, and of a partial range displayed in a display region of the second image, the relative position of a point corresponding to the farthest point in the first image, as to the second image, are equal. Corresponding ranges between images before and after switching therebetween can be displayed with the display scale fixed, such that the probability of the displayed region extending outside of the entire image is reduced and comparison of images is facilitated.

20 Claims, 19 Drawing Sheets

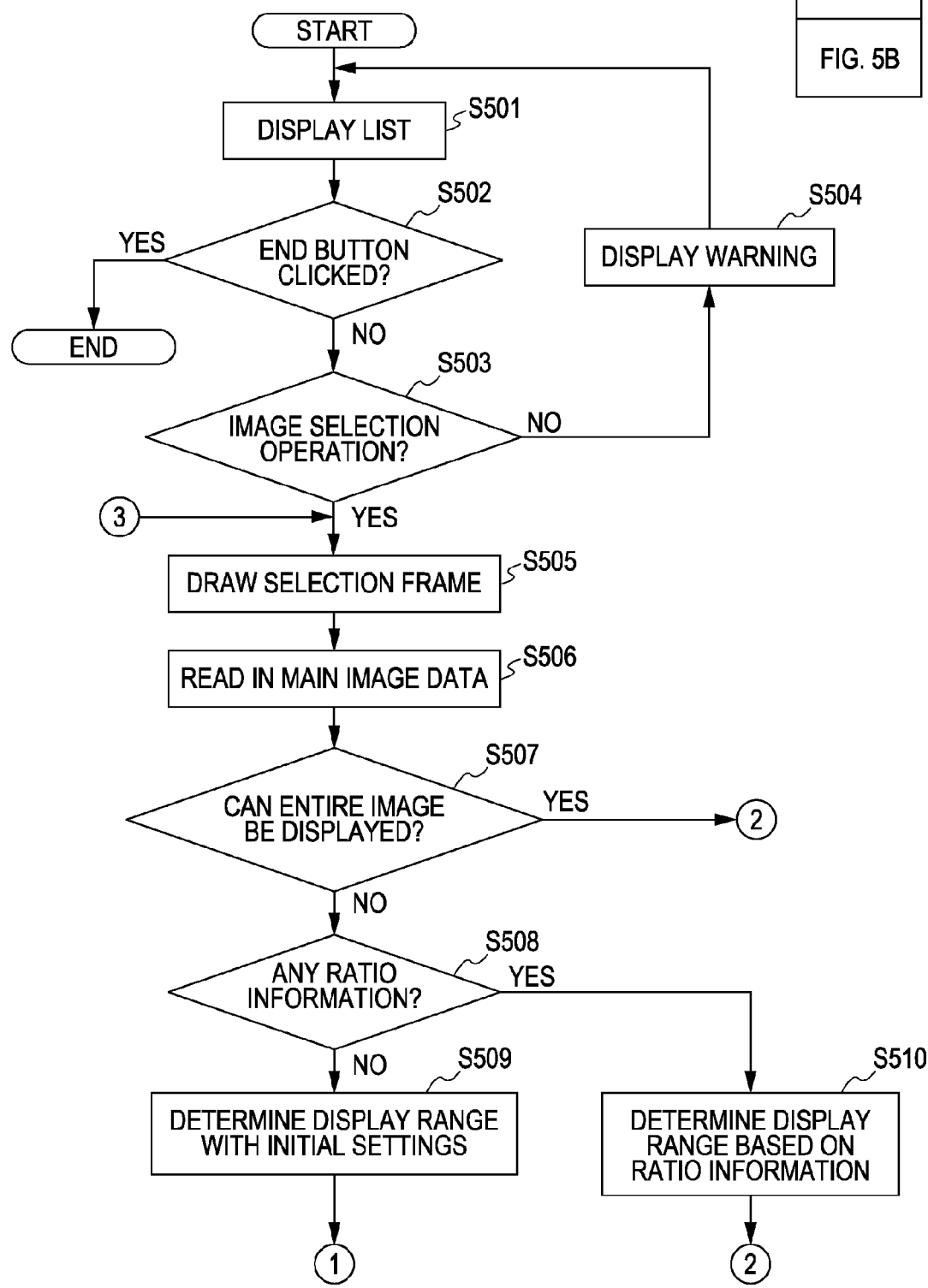

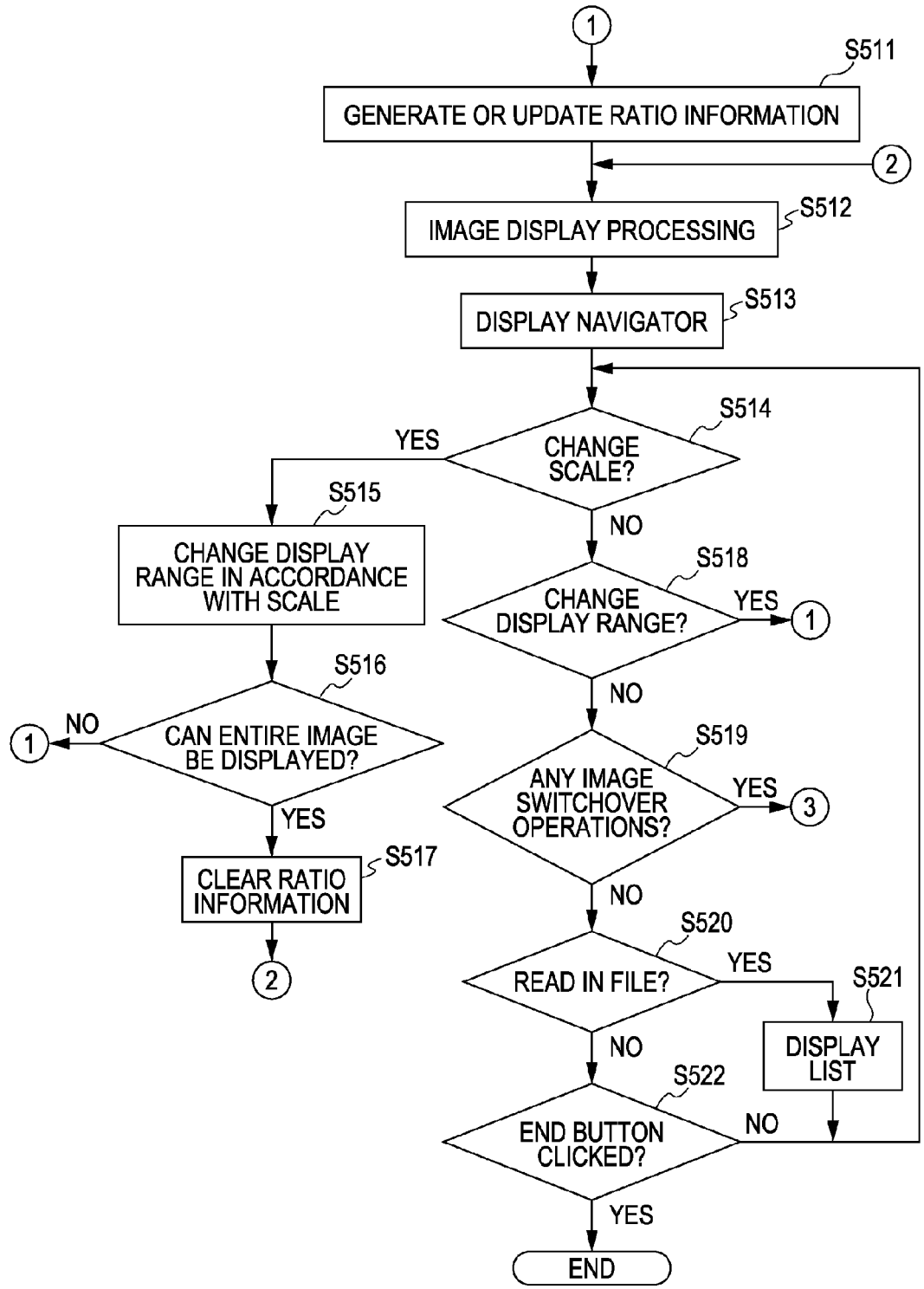

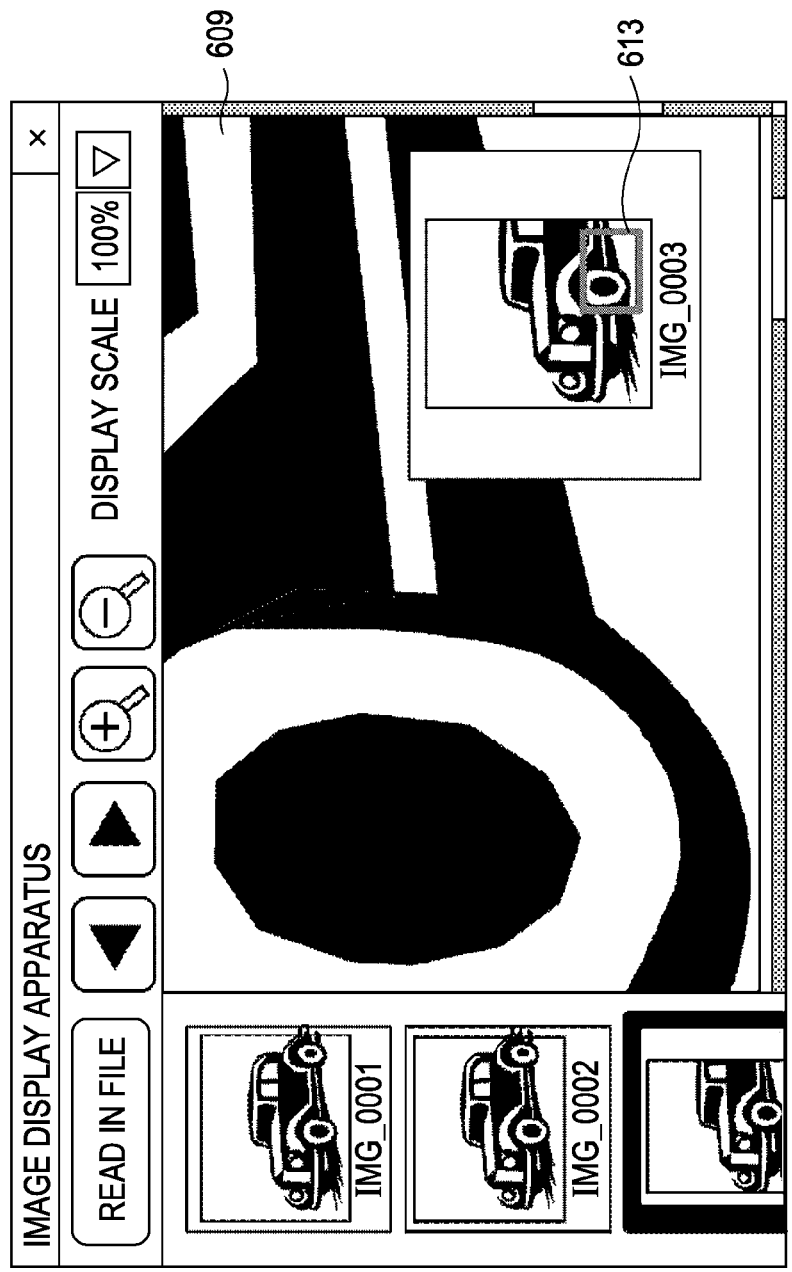

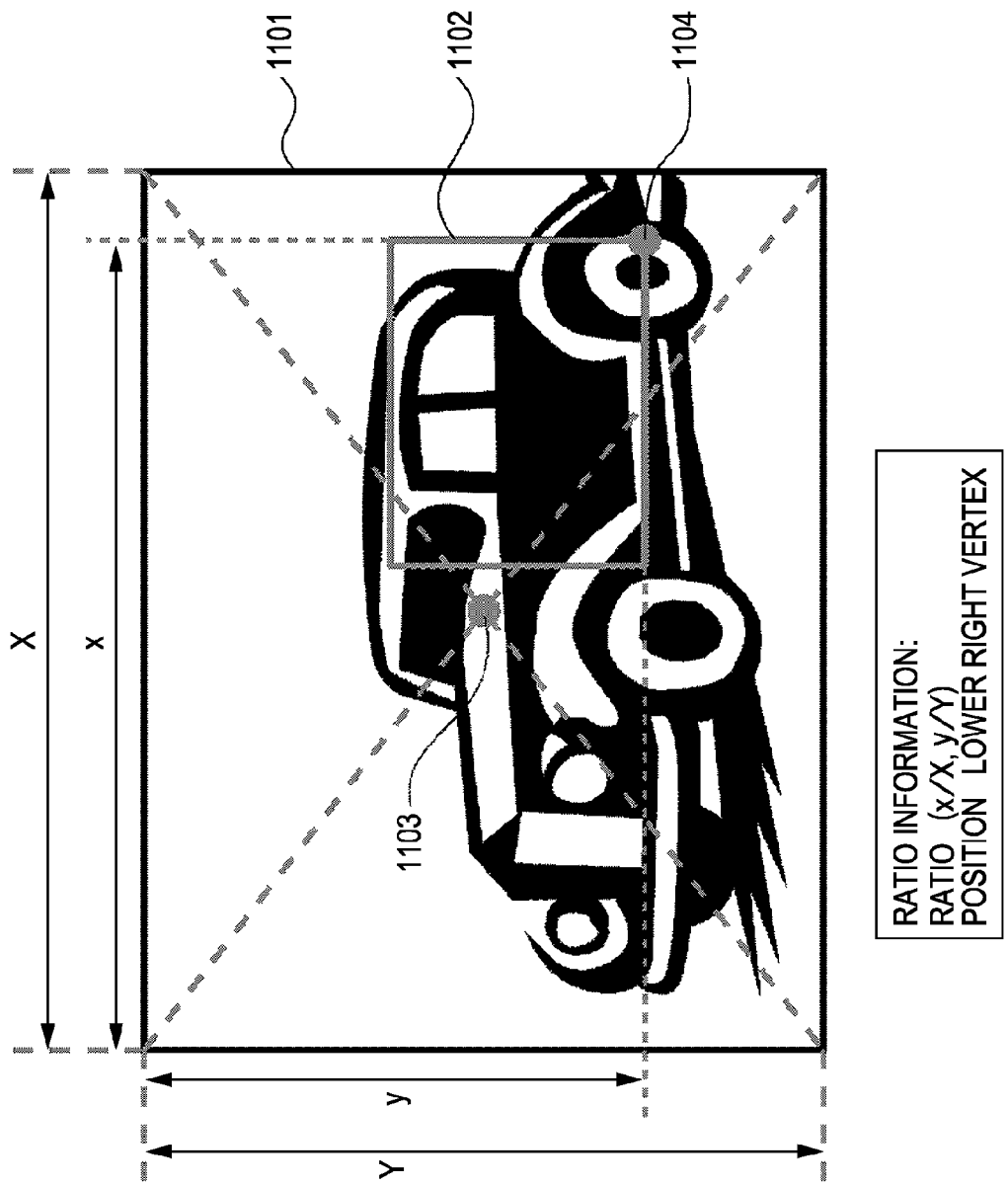

nX1/ImageB1_Width = nX/Image_Width
nY1/ImageB1_Height = nY/Image_Height fX1/ImageB1_Width = fX/Image_Width
fY1/ImageB1_Height = fY/Image_Height nX2/ImageB2_Width = nX/Image_Width
nY2/ImageB2_Height = nY/Image_Height fX2/ImageB2_Width = fX/Image_Width
fY2/ImageB2_Height = fY/Image_Height ibX0/ImageB_Width = fX/Image_Width
ibY1/ImageB_Height = fY/Image_Height ibAveX/ImageB_Width = iAveX/Image_Width
ibAveY/ImageB_Height = iAveY/Image_Height ibAveX/ImageB_Width = iAveX/Image_Width
ibAveY/ImageB_Height = iAveY/Image_Height

IMAGE DISPLAY CONTROL APPARATUS AND IMAGE DISPLAY CONTROL METHOD

BACKGROUND OF THE INVENTION

1. Field of the Invention

The present invention relates to an image display control apparatus for displaying multiple images.

2. Description of the Related Art

In recent years, the increase in capacity of recording media for recording images has led to users taking a great number of pictures with digital cameras and saving a great number of images. Further, the performance of image pickup devices has improved, and digital cameras have come to be able to record images of a size (number of recorded pixels) so great that the image cannot fit onto a display apparatus.

On the other hand, digital cameras have various functions to handle different user needs, such as the user optionally specifying the image size, or recording in different image sizes at the same time.

As such, user have come to commonly search for a desired image from a great number of images, and print this image, or enlarge and compare images to adjust brightness, contrast, and so forth.

For example, Japanese Patent Laid-Open No. 5-274417 describes an arrangement wherein, in the event of comparing images of which the size that is permissible for display has been exceeded, a part of the image can be displayed in an enlarged manner in accordance with user operations. At the time of switching between displayed images in the enlarged state, the coordinates of the range to be displayed of the entire image are fixed, so that the corresponding position can be displayed.

Also, Japanese Patent Laid-Open No. 2006-60387 describes an arrangement wherein, with an image processing apparatus which displays an image in an enlarged manner, if one image is being viewed in an enlarged manner, the next image can be displayed in an enlarged manner with the enlargement position and the enlargement scale maintained. In the event of forwarding through images of different sizes, the enlargement position is calculated from the percentage of the entire image, and images can be forwarded through with relative position and scale as to the entire image being maintained.

However, with the arrangement described in Japanese Patent Laid-Open No. 5-274417, in cases of displaying images of different size in an enlarged state, portions which are relatively different are displayed, making comparison difficult. Also, in cases of switching to an image of a different size, switching between landscape and portrait orientations, and so forth, the display range may extend outside of the entire image.

Also, with the display method described in Japanese Patent Laid-Open No. 2006-60387, the enlargement scale to be held at the time of forwarding through images is a relative enlargement scale. Accordingly, with this arrangement, a user cannot forward through images of different sizes and comparing corresponding ranges, with the display scale which is the ratio between the number of recorded pixels of the image and the number of pixels on the display apparatus used for displaying the entire image fixed.

That is to say, with the related art, a user has not been able to switch images with a fixed display scale which is the ratio between the number of recorded pixels of the image and the number of pixels on the display apparatus used for displaying the entire image, and display corresponding ranges of the images before switching and after switching, without the display range extending outside of the image.

SUMMARY OF THE INVENTION

The present invention provides an image display control apparatus capable of displaying corresponding ranges between images before and after switching therebetween with the display scale fixed, wherein the possibility of the displayed region extending outside of the entire image is reduced.

According to an aspect of the present invention, an image display control apparatus includes a display control unit configured to display a partial range of an image on a display region on a display apparatus; a switching unit configured to switch an image displayed in the display region from a first image to a second image having a different number of recording pixels, with a display scale which is the ratio of number of recording pixels of an image and number of pixels on the display apparatus used for displaying the entirety of the image is fixed; a reference point determining unit configured to determine, from a range of the first image displayed in the display region, a reference point, based on a side or point farthest from the center of the first image in the horizontal direction, and a side or point farthest from the center of the first image in the vertical direction; a storage control unit configured to effect control such that relative position information indicating the relative position of the reference point as to the first image is stored; a display range determining unit configured to determine a range displayed in the display region in the second image, such that the relative position of a point in a range displayed in the display region in the second image which corresponds to the reference point in the first image, as to the second image, is of a relative position which the relative position information indicates.

Thus, according to an aspect of the present invention, provided is an image display control apparatus capable of displaying corresponding ranges between images before and after switching therebetween with the display scale fixed, wherein the possibility of the displayed region extending outside of the entire image is reduced, thereby facilitating comparison of images.

According to this configuration, with an apparatus having image display functions, at the time of displaying images one after another with the display scale based on display resolution fixed, a corresponding range can be displayed even for images of different sizes or images with different orientation, so comparison of images is easy. Also, the probability of the display range extending out from the entire image can be reduced.

This summary of the invention does not necessarily describe all necessary features so that the invention may also be a sub-combination of these described features. Further features and aspects of the present invention will become apparent from the following description of exemplary embodiments with reference to the attached drawings, in which similar reference characters are used to designate the same or similar parts throughout the figures thereof.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 5 is a flowchart showing image display control processing with the image display control apparatus according to the first embodiment.

FIG. 10 is a display example of a user interface in the Case 4 with the image display control apparatus according to the first embodiment.

FIG. 11 is a conceptual diagram for describing a method for generating relative position information with the first embodiment.

DESCRIPTION OF THE EMBODIMENTS

Exemplary embodiments of the present invention will be described in detail below with reference to the accompanying drawings. It is to be noted that the following exemplary embodiments are merely examples for implementing the present invention and can be appropriately modified or changed depending on individual constructions and various conditions of apparatuses to which the present invention is applied. Thus, the present invention is in no way limited to the following exemplary embodiments.

First Embodiment

Figure 1:
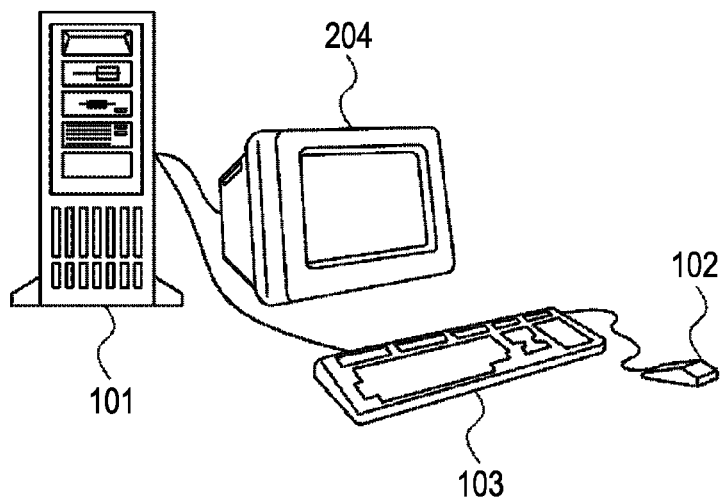
FIG. 1 is a diagram illustrating a configuration example of a personal computer system, as an example of an image display control apparatus according to a first embodiment.

FIG. 1 illustrates a configuration example of a personal computer system, as an example of an image display control apparatus by which the present invention can be carried out. In FIG. 1, a computer 101 is a main unit of a personal computer, a mouse 102 which is a representative pointing device and a keyboard 103 serve as input apparatuses for inputting instructions from a user to the main unit, and a display 204 serves as a display apparatus for displaying data.

Figure 2:
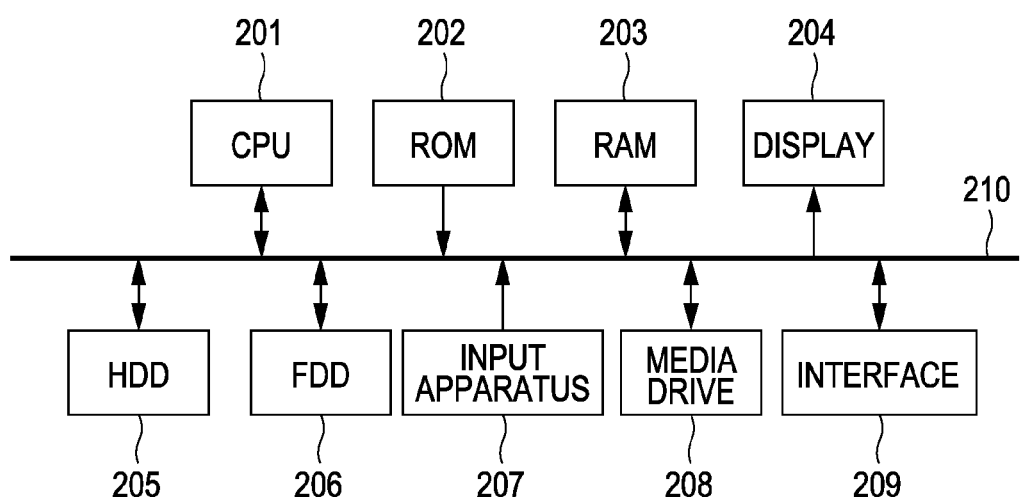
FIG. 2 is a block diagram illustrating a configuration example of a personal computer system, as an example of the image display control apparatus according to the first embodiment.

FIG. 2 is a block diagram illustrating a configuration example of the personal computer system, as an example of the image display control apparatus according to the present embodiment. In FIG. 2, a CPU 201 is a control unit for governing control of the entire personal computer system. ROM 202 has recorded therein operation processing procedures of the CPU 201 (e.g., programs such as computer start-up processing, basic input/output processing, etc.). RAM 203 functions as main memory of the CPU 201. The CPU 201 loads various types of programs including a control program for realizing the later-described processing from the ROM 202 or a hard disk drive 205 or the like, loads the programs to the RAM 203, and executes.

The hard disk drive 205 (hereinafter abbreviated to HDD 205) and a floppy disk drive 206 (hereinafter abbreviated to FDD 206) are each used for saving and reading in of application programs, data, libraries, and so forth. Also, instead of or in addition to the FDD 206, optical or magneto-optical disc drives such as CD-ROM, MO, DVD, etc., magnetic tape drives such as a tape streamer, DDS, and so forth, may be provided. An input apparatus 207 is configured of the aforementioned mouse 102 and keyboard 103. A media drive 208 is mounted with various types of recording media such as a memory card or the like in which is recorded images taken with a digital camera, whereby the recorded data can be read out. An interface 209 enables data exchange with various external devices such as digital cameras or the like, connected either by cable or wirelessly. A generally-used interface 209 is a USB interface, for example. A system bus 210 is for connecting between the above-described units, and is configured of an address bus, data bus, and control bus.

Figure 3:
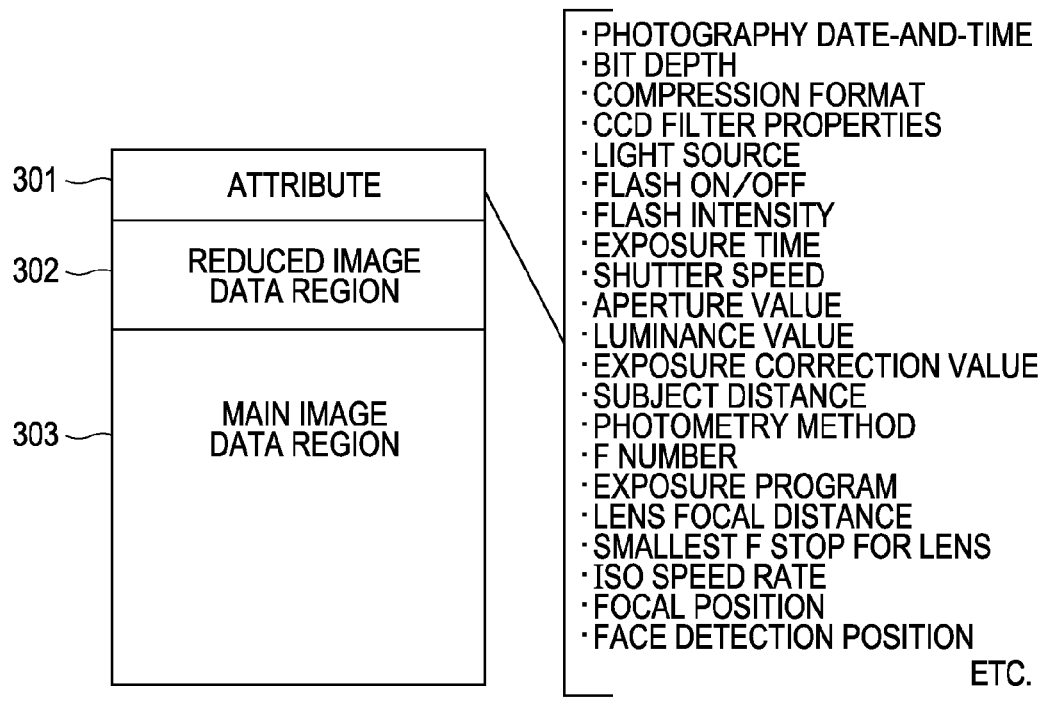
FIG. 3 is a schematic configuration diagram illustrating an example of an image file displayable with the image display control apparatus according to the first embodiment.

Next, a schematic configuration of an image taken with a digital camera will be described as an example of an image which can be displayed with the image display control apparatus according to the present embodiment, with reference to FIG. 3. FIG. 3 is a schematic configuration diagram of an image file created with a general image recording format. The image file is configured of an attribute information region 301, a reduced image data region 302, and a main image data region 303. The attribute information region 301 is a region for storing photography time information and various types of attribute information necessary for reading, playing and selecting images. Examples of information which can be stored in the attribute information region 301 include image data size, width of image (number of pixels), height of image (number of pixels), photography date-and-time, apparatus used for photography, compression format, flash on/off, focal distance, focal position, face detection position, and so forth. Other examples of types of information which can be stored are shown in FIG. 3. The reduced image data region 302 is a region for storing reduced image data (a so-called thumbnail image) for displaying in a later-described list display. The main image data region 303 is a region for storing main portion data of the image for the image file to store.

Hereafter, scale based on the ratio between the number of recorded pixels of an image recorded in an image file, and the pixels of an image display unit used for displaying the entire image (e.g., display 204) will be referred to as "scale based on display resolution", or simply "display resolution". Also, in a case wherein the ratio between the number of recorded pixels of an image and the pixels of the image display unit used for displaying the entire image is 1:1, this will be referred to as "same pixel scale" or "display scale of 100%". In the same way, the display scale will be shown in percentages in accordance with the ratio between the number of recorded pixels of an image and the pixels of the image display unit used for displaying the entire image. For example, in the case of 4:1, this is written as 25%, and in the case of 1:4, this is written as 400%. In the event that an image wherein the number of recorded pixels is 1,280 pixels horizontal and 960 pixels vertical, is to be displayed in its entirety, and the display scale is 25%, a region on the image display unit which is 320 pixels horizontal and 240 pixels vertical is used for display. Also, in the event of displaying this file in its entirety, and the display scale is 400%, a region on the image display unit which is 5,120 pixels horizontal and 3,840 pixels vertical is used for display.

Overview of Image Display Control Apparatus

Figure 6:
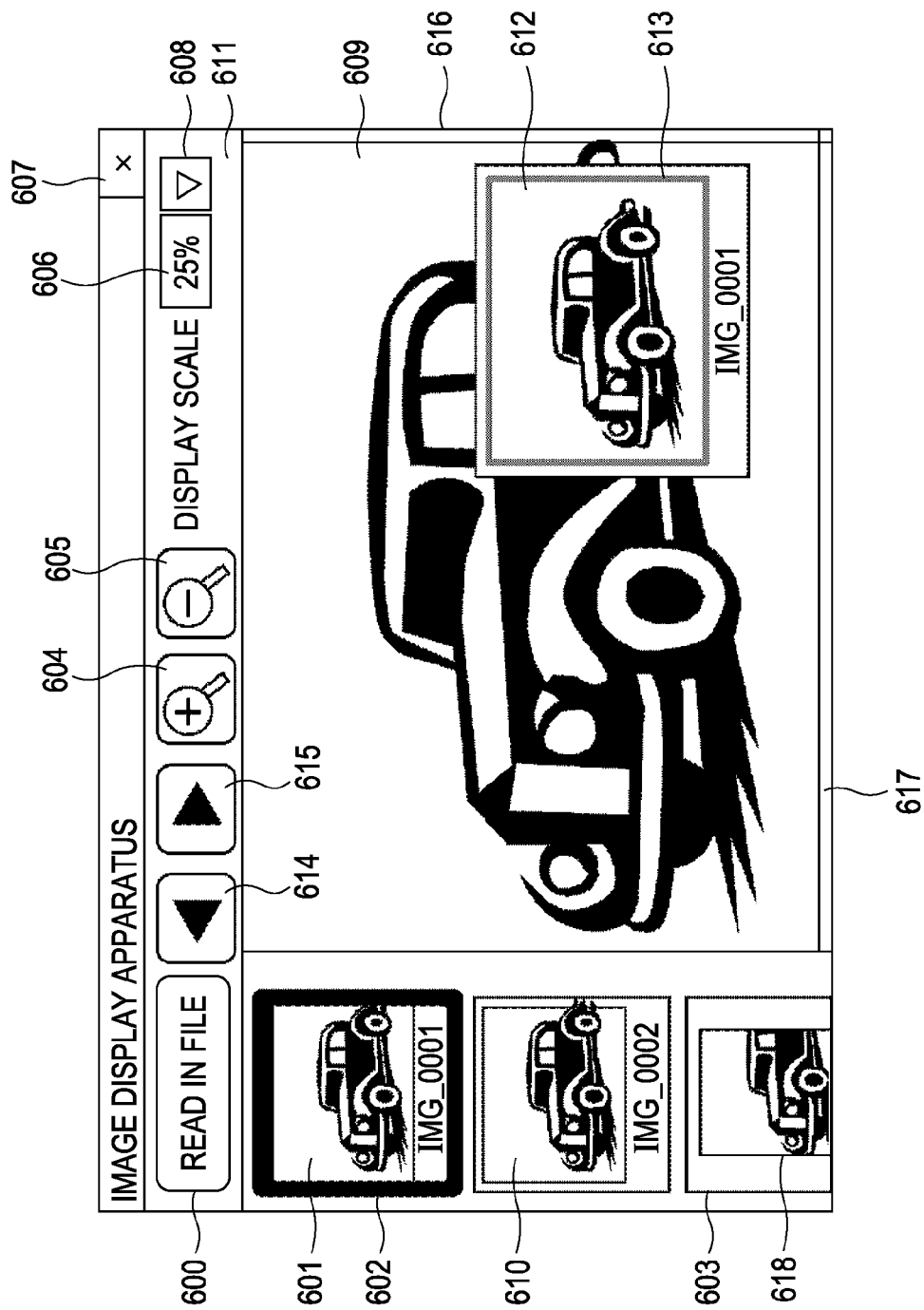
FIG. 6 is a display example of a user interface in a Case 1 with the image display control apparatus according to the first embodiment.

FIG. 6 shows an example of a display screen which is stored in the ROM 202 and displayed on the display 204 by image display application software which is a program executed by the CPU 201, as an example of a user interface of the image display control apparatus according to the present embodiment. The display screen is configured of a thumbnail area 603 which is an area for viewing a list of images, a preview area 609 which is a display region in which images can be enlarged, an area 611 in which operation icons for performing change in display scale and so forth are displayed, and a navigator 612 which is a window for displaying the entire image currently selected, and a frame 613 indicating the range displayed thereof in the preview area 609.

A file read-in button 600 is an operation icon for specifying an image file to be read in from the HDD 205, FDD 206, media drive 208, or the like, and be displayed in the thumbnail area 603.

Image switchover buttons 614 and 615 are operation icons for performing switchover of images displayed in the preview area 609. Clicking the switchover button 614 selects an image one back, and clocking on the switchover button 615 selects the next image. The selected image is displayed in the preview area 609. Selection of the image to be displayed in the preview area 609 is performed by clicking these switchover buttons 614 and 615 and later-described list reduction images 601 and 610. In the event that an image at the head of the thumbnail area 603 has already been selected, no image above can be selected, so clicking of the image switchover button 614 is disabled. In the same way, in the event that an image at the end of the thumbnail area 603 has already been selected, no image below can be selected, so clicking of the image switchover button 615 is disabled. Being disabled includes being displayed in a form whereby the user can intuitively recognize that clicking thereof is an invalid command.

An enlarge button 604 is a button for enlarging the display scale of the image in the preview area 609 by one step. For example, in the event that the display scale of the image in the preview area 609 is 50%, clicking the enlarge button 604 enlarges this to a display scale of 75%. In the event that the upper limit for display scale is determined, and the display scale of the image currently being displayed is already at that upper limit, the enlarge button 604 is disabled and displayed in a form whereby the user can intuitively recognize that clicking thereof is an invalid command. For example, if the upper limit is 400%, and the display scale of the image currently being displayed is 400%, no further enlargement can be made, so the enlarge button 604 is disabled and displayed in a form whereby the user can intuitively recognize that clicking thereof is an invalid command.

A reduce button 605 is a button for reducing the display scale of the image in the preview area 609 by one step. For example, in the event that the display scale of the image in the preview area 609 is 50%, clicking the reduce button 605 reduces this to a display scale of 40%. In the event that the lower limit for display scale is determined, and the display scale of the image currently being displayed is already at that lower limit, the reduce button 605 is disabled and displayed in a form whereby the user can intuitively recognize that clicking thereof is an invalid command.

A display scale specification box 606 is a list box for specifying the display scale of the image in the preview area 609. Clicking a down arrow button 608 in the display scale specification box 606 brings up a pull-down menu showing a list of display scales, from which the user can specify a display scale by clicking. The display scales listed in the display scale specification box 606 are, for example, 12.5%, 5%, 25%, 40%, 50%, 75%, 100%, 200%, and 400%. These display scales are scales based on the display resolution, as described earlier. For example, in the event that the user selects the display scale of 25%, an image recorded with 1,600 pixels horizontal and 1,200 pixels vertical is displayed in the preview area 609 thinned out, using a range of 400 pixels horizontal by 300 pixels vertical on the display 204.

List reduction images 601, 610, and 618 are display examples of thumbnails of image files read in by the file read-in button 600 having been pressed. A selection frame 602 displays reduced images of image displayed in the preview area 609 which the user has selected. With the present embodiment, the selection frame 602 around the reduced image of the selected is displayed, but this is not restricted to a frame display, and any sort of display may be made for the selection frame 602 as long as the user can recognize the selected image, such as changing the color, showing a check mark, or the like, for example. Selection of an image to be displayed in the preview area 609 is performed by the above-described image switchover buttons 614 and 615 or by moving a pointing device over the list reduction images 601, 610, or 618, and clicking.

A vertical direction scroll bar 616 and horizontal direction scroll bar 617 are operating members for moving the display region in the vertical direction and horizontal direction respectively, in the event that the entire image does not fit in the preview area 609 when displayed. In the event that the entire image cannot be displayed, the percentage of the portion displayed in the preview area 609 as to the entire image is indicated by a thumb. The thumbs can be moved by dragging with a pointing device or the like, so as to move the region of the entire image which is displayed in the preview area.

An end button 607 is an operation icon for ending the display on the display 204 with the image display application software according to the present embodiment.

Image Display Control Processing

FIG. 5 is a flowchart illustrating the image display control processing according to the present embodiment. Note that this processing is realized by the CPU 201 loading a control program stored in the ROM 202 to the RAM 203 and executing it. The image display control processing in FIG. 5 will be described using the display screen example shown in FIG. 6.

Upon starting the image display control processing, the CPU 201 first in step S501 reads in the reduction image data of the image which the user has selected from the HDD 205, FDD 206, media drive 208, or the like, to the RAM 203, and displayed a reduced image in the thumbnail area 603. If the image which the user has selected is an image taken by a digital camera as described above for example, this reduced image is the reduction image data stored in the reduction image data region 302 in FIG. 3 being displayed. Also, the user selects a desired image with a standard file open dialogue box activated by the file read-in button 600.

Next, in step S502, the CPU 502 determines whether or not the end button 607 has been clicked. In the event that the end button 607 has been clicked, the image display control processing ends. Otherwise, the flow proceeds to step S503.

Figure 4:
FIG. 4 is a diagram illustrating an example of a warning displayed with the image display control apparatus according to the first embodiment.

In step S503, determination is made regarding whether or not there has been a selection operation of an image. A selection operation is an operation for clicking on a reduced image displayed in the thumbnail area 603, or clicking on the image switchover buttons 614 and 615. In the event that no image selection operation has been made, the flow proceeds to step S504, and a warning prompting selection of an image is displayed, such as shown in FIG. 4. The flow then returns to step S501 and awaits image selection operation by the user. In the event that determination is made in step S503 that there has been an image selection operation by the user, the flow proceeds to step S505.

In step S505, the reduced image representing the selected image of the reduced images displayed in the thumbnail area 602 is displayed with a selection frame 602 thereupon.

In the following step S506, the main image data of the selected image is read in from the HDD 205, FDD 206, media drive 208, or the like, to the RAM 203. If the image which the user has selected is an image taken by a digital camera as described above for example, this main image data is the main image data stored in the main image data region 303 in FIG. 3 being displayed.

In step S507, whether or not the entire image shown by the main image data read in in step S506 can be displayed within the preview area 609 region at the specified display scale is determined. The specified display scale is the display scale specified in a later-described step S514. In the event that this is before the display scale is specified in step S514, a display scale which has been set beforehand as an initial value is taken as the display scale. Details of the determination method in this step S507 will be described later. In the event that determination is made that the entire image can be displayed within the preview area 609 region at the specified display scale, the flow proceeds to step S512, and otherwise, the flow proceeds to step S508.

In step S508, determination is made regarding whether or not relative position information (ratio information) generated or updated in a later-described step S511 is held in the RAM 203. Note that in the event that this is before the relative position information is generated or updated in step S511, determination is made that no relative position information is held. Details of this relative position information will be described later in the description of step S511. In the event that determination is made that relative position information is held, the flow proceeds to step S510, and if determination is made that relative position information is not held, the flow proceeds to step S509.

In step S509, no relative position information is held, so the display range of the image is determined based on initial settings set beforehand. As an initial setting, a range adjusted by matching the upper left corner of the preview area 609 and the upper left corner of the image that is selected is determined. In this case, a range wherein the selected image can be displayed at the specified display scale, such that the image fits within the preview area 609 with the upper left corner of the preview area 609 and the upper left corner of the image that is selected matching, is determined as the display range. Upon determining the display range, the flow proceeds to step S511.

In step S511, information of the ratio of display range of the entire selected image that has been determined (relative position information) is generated or updated, and stored in the RAM 203. This relative position information indicates the relative position in the entire image that is selected, which has been determined as the display range. As this relative position information, the ratio of the farthest point in the display range of the image that is selected from the center of the entire image that is selected, as to the entire image, is stored. Also, information of the reference point by which this ratio has been calculated is also stored. Details of this ratio and what sort of ratio is stored as the relative position information will be described later.

On the other hand, in the event that determination has been made in step S508 that relative position information is held, the flow proceeds to step S510, and the display range of the image is determined based on the held relative position information. That is to say, the ratio as to the entire image of a point in the selected image corresponding to the information of the reference point by which the ratio included in the held relative position information has been calculated is made to match the ratio included in the relative position information. With this point as a reference, the range which can be displayed at the display scale specified for the preview area 609 is determined as the display range. Details of a determination method for the display range will be described later. Upon determining the display range, the flow proceeds to step S512, and the relative position information is not updated. The reason that relative position information is not updated here is that the user most likely will want to confirm the display range corresponding to the display range of the image at the time of generating the relative position information, even if the image is switched over, until there are operations for changing the display range (a later-described step S518). Thus, the user can confirm the respectively corresponding display ranges for three or more images. Also, in the event that the user has switched the image without performing an operation for changing the display range, and switched the image back to the image regarding which the relative position information has been generated, the same display range as that at the time of generating the relative position information can be confirmed.

In step S512, the display range determined for the selected image, or the entire image in the event that the entire image can be displayed, is displayed in the preview area 609 at the specified display scale.

In step S513, a frame 613 indicating what portion of the selected image is currently being displayed in the preview area 609, is displayed in the navigator 612, along with a reduced image indicating the entire image of the selected image.

In step S514, determination is made regarding whether or not there have been operations for specifying or changing the display scale. The operations for specifying or changing the display scale are performed by operating one of the enlarge button 604, reduced button 605, or the display scale specification box 606, as described earlier. In the event that determination is made that there have been operations made for specifying or changing the display scale, the flow proceeds to step S515, and in the event that determination is made that there have been no operations made for specifying or changing the display scale, the flow proceeds to step S518.

In step S515, the display range of the entirety of the selected image to be displayed in the preview area 609 is changed in accordance with the change in display scale. Upon changing the display range, the flow proceeds to step S516.

In step S516, in accordance with change in the display scale made in step S514, determination is made regarding whether or not the entire selected image can not be displayed so as to fit in the preview area 609. The determination here is similar to that in step S507, and accordingly description of the details thereof will be omitted. In the event that determination is made that the entire selected image can be displayed so as to fit in the preview area 609, the flow proceeds to step S517, where any relative position information held in the RAM 203 is cleared and the flow proceeds to step S512. In the event that determination is made that the entire selected image cannot be displayed so as to fit in the preview area 609, the flow proceeds to step S511, where the relative position information is generated or updated so as to indicate the ratio of the display range changed in the display scale changing processing performed in step S514 and S515.

On the other hand, in the event that determination is made in step S514 that there have been no operations made for specifying or changing the display scale, display range changing operations are performed with the vertical direction scroll bar 616 and horizontal direction scroll bar 617 as described above, or by directly operating the frame 613 displayed in the navigator 612. In the event that determination is made that there have been operations made for changing the display range, the flow proceeds to step S511, where the relative position information is generated or updated so as to indicate the ratio of the display range regarding which the relative position information has been changed. In the event that determination is made that there have been no operations made for changing the display range, the flow proceeds to step S519.

In step S519, determination is made regarding whether or not there have been operations for switching over images. Operations for switching over images are performed with the clicking on the image switchover buttons 614 and 615 as described above, or by clicking on a list reduction image displayed in the thumbnail area. In the event that determination is made that there have been operations for switching over images, the flow proceeds to step S505, and display processing of the image selected by the image switchover operation is performed. At this time, if there is relative position information held in the RAM 203, the display range of the image to be displayed in the preview area 609 following switching will be determined based on the relative position information that is held (steps S508 and S510). In the event that determination is made that there have been no operations for switching over images, the flow proceeds to step S520.

In step S520, determination is made regarding whether or not the file read-in button 600 has been operated to read in an image from the HDD 205, FDD 206, media drive 208, or the like, to change the image files displayed in the thumbnail area 603. In the event that determination is made that changing operations have been performed, the flow proceeds to step s521, and the image specified by operating the file read-in button 600 is read in from the HDD 205, FDD 206, media drive 208, or the like, and displayed in the thumbnail area 603. Upon updating the reduction image list displayed in the thumbnail area 603, the flow proceeds to step S514. On the other hand, in the event that determination is made that there have been no changes made to the image files to be displayed in the thumbnail area 603, the flow proceeds to step S522.

In step S522, determination is made regarding whether or not the end button 607 has been clicked. In the event that the end button 607 has not been clicked, the flow proceeds to step S514, and awaits input of steps S514 through S522. In the event that the end button 607 has been clicked, the image display control processing ends.

Details of Step S507

Now, the details of the determination method for determining in step S507 in FIG. 5 whether or not the entire image can be displayed within the region of the preview area 609 at the specified display scale will be described.

The following values are variables.
View_Mag: The display scale (%) which the user has specified (scale based on display resolution)
Image_Width: The width of the entire main image of the image that has been selected (number of pixels)
Image_Height: The height of the entire main image of the image that has been selected (number of pixels)
ViewArea_W: The width of the preview area 609 on the display apparatus (number of pixels)
ViewArea_H The height of the preview area 609 on the display apparatus (number of pixels)

The width (number of pixels) of the changed-scale image obtained by changing the scale of the selected image by the specified display scale, and the height (number of pixels) of the changed-scale image obtained by changing the scale of the selected image by the specified display scale, are shown in Expression (1).

$$PrevImg\_W = Image\_Width \times View\_Mag/100$$

$$PrevImg\_H = Image\_Height \times View\_Mag/100 \qquad (1)$$

In the event that one of the following Expressions (2) and (3) is false, the entire image shown by the main image data read in in step S506 cannot be displayed within the preview area 609 region at the specified display scale. Accordingly, in the event that Expressions (2) and (3) are both true, determination is made that the entire image can be displayed within the preview area 609 region.

$$PrevImg\_W \leq ViewArea\_W \qquad (2)$$

$$PrevImg\_H \leq ViewArea\_H \qquad (3)$$

Details of Relative Position Information in Step S511

The relative position information generated or updated in step S511 will be described. As described above with the present embodiment, the ratio as to the entire image of the farthest point of the display range of the image that is selected from the center of the entire image that is selected, is stored as the relative position information. Further, information indicating at what position of the display range the farthest point from the center of the entire image that is selected, is situated, is also stored as the relative position information.

This relative position information will be described with reference to FIG. 11. A range indicated as display range 1102 is shown in the preview area 609 in FIG. 6 on the entire image 1101 that is currently selected. At this time, the ratio of the point 1104 which is the farthest in the display range 1102 from the center 1103 of the entire image 1101, as to the entire image 1101, is stored as the relative position information.

With the width of the entire image as X, the height of the entire image as Y, and the coordinates of the point 1104 taking the upper left corner of the image as the point of origin as (x, y), this ratio is (x/X, y/Y).

Description will be made in further detail. Note that in the following, the numeral 1 represented in the coordinates corresponding to 1 pixel on the display apparatus or 1 pixel of recording pixels. In a case wherein the upper left corner of the image following changing at the specified display scale is taken as the point of origin, the coordinates of the corners of the display range out of the scale-changed entire image that is displayed in the preview area 609 are as follows.

v_p1(vX0, vY0): Coordinates of upper left corner
v_p2(vX0, vY1): Coordinates of lower left corner
v_p3(vX1, vY0): Coordinates of upper right corner
v_p4(vX1, vY1): Coordinates of lower right corner Note that |vX1−vX0| is equivalent to ViewArea_W, and that |vY1−vY0| is equivalent to ViewArea_H.

In a case wherein the upper left corner of the main image before following changing scale is taken as the point of origin, the coordinates of the corners of the display range out of the entire image that is displayed in the preview area 609 are as follows.

i_p1(iX0, iY0): Coordinates of upper left corner
i_p2(iX0, iY1): Coordinates of lower left corner
i_p3(iX1, iY0): Coordinates of upper right corner
i_p4(iX1, iY1): Coordinates of lower right corner Note that the individual values of the coordinates of the corners of the display range out of the entire image that is displayed in the preview area 609 can be calculated as with the Expression (4).

$$iX0 = vX0 \times 100 / \text{View\_Mag}$$

$$iX1 = vX1 \times 100 / \text{View\_Mag}$$

$$iY0 = vY0 \times 100 / \text{View\_Mag}$$

$$iY1 = vY1 \times 100 / \text{View\_Mag} \quad (4)$$

The coordinates of the center of the main image centerP (cX, cY) is shown in Expression (5).

$$cX = \text{Image\_Width}/2$$

$$cY = \text{Image\_Height}/2 \quad (5)$$

The distances from the individual corner coordinates i_p1, i_p2, i_p3, i_p4 to the coordinates of the center of the main image centerP(cX, cY), to the second power, are each as p1_dis, p2_dis, p3_dis, and p4_dis, respectively, and the calculation method thereof is shown in Expression (6).

$$p1\_dis = (iX0 - cX)^2 + (iY0 - cY)^2$$

$$p2\_dis = (iX0 - cX)^2 + (iY1 - cY)^2$$

$$p3\_dis = (iX1 - cX)^2 + (iY0 - cY)^2$$

$$p4\_dis = (iX1 - cX)^2 + (iY1 - cY)^2 \quad (6)$$

Of the p1_dis, p2_dis, p3_dis, and p4_dis shown in Expression (6), the coordinates of the corner corresponding to the greatest value are the coordinates of the corner of the display range the farthest from the center of the image, taken as p_furthest(fX, fY). The ratio of the coordinates p_furthest (fX, fY) of corner of the display range the farthest from the center of the image as to the entire image (fX/Image_Width, fY/Image_Height) and position information (one of upper left, lower left, upper right, lower right) are stored as relative position information (ratio information).

Display Range Determining Method Based on Relative Position Information in Step S510

Step S510 is processing usable in a case of selecting, from a state wherein an image A (first image) from which relative position information has been generated is displayed partially in an enlarged manner, a different image B (second image), without changing the scale. With the present embodiment, the display range of the image B is calculated such that the ratio which the relative position information indicates, and the ratio between the size of the entire image B and the position of the coordinates of the display range of the image B which the relative position information indicates (one of upper left, lower left, upper right, lower right), match.

Coordinates p_fB(fbX, fbY) of the position of the display range of the image B which the relative position information indicates are calculated so as to satisfy Expression (7), with the width and height of the image B being held to the following variables.

ImageB_Width: Width of main image (image B) to be displayed (number of pixels)
ImageB_Height: Width of main image (image B) to be displayed (number of pixels)
p_fB(fbX, fbY): XY coordinates of a position of the display range of the image B which the relative position information indicates $$fX/\text{Image\_Width} = fbX/\text{Image}B\_\text{Width}$$

$$fY/\text{Image\_Height} = fbY/\text{Image}B\_\text{Height} \quad (7)$$

Accordingly, Expression (8) is obtained.

$$fbX = \text{Image}B\_\text{Width} \times fX/\text{Image\_Width}$$

$$fbY = \text{Image}B\_\text{Height} \times fY/\text{Image\_Height} \quad (8)$$

The range which fits in the preview area 609 is determined as the display range, based on the coordinates p_fB(fbX, fbY) of the position of the display range which the relative position information indicates, thus obtained.

This will be described with a case wherein the position of the display range which the relative position information indicates is the "lower right corner". The coordinates of the corners of the display range displayed in the preview area 609, of the entire main image of the image B are as follows.

iB_p1(ibX0, ibY0): Coordinates of the upper left corner
iB_p2(ibX0, ibY1): Coordinates of the lower left corner
iB_p3(ibX1, ibY0): Coordinates of the upper right corner
iB_p4(ibX1, ibY1): Coordinates of the lower right corner The position which the relative position information indicates is the "lower right corner", so the coordinates p_fB(fbX, fbY) of the position of the display range which the relative position information indicates are equal to iB_p4(ibX1, ibY1). Accordingly, ibX1, ibY1 is as shown in Expression (9).

$$ibX1 = fbX = \text{Image}B\_\text{Width} \times fX/\text{Image\_Width}$$

$$ibY1 = fbY = \text{Image}B\_\text{Height} \times fY/\text{Image\_Height} \quad (9)$$

Based on Expression (9), the remaining ibX0, ibY0 is obtained. This is a range which fits into the preview area 609, yielding Expression (10).

$$|ibX1 - ibX0| \times \text{View\_Mag}/100 = \text{ViewArea\_W}$$

$$|ibY1 - ibY0| \times \text{View\_Mag}/100 = \text{ViewArea\_H} \quad (10)$$

Accordingly, ibX0, ibY0 is obtained as in Expression (11).

$$ibX0 = ibX1 - (\text{ViewArea\_W} \times 100/\text{View\_Mag})$$

$$ibY0 = ibY1 - (\text{ViewArea\_H} \times 100/\text{View\_Mag}) \quad (11)$$

The above method is used to calculate the corners iB_p1, iB_p2, iB_p3, iB_p4 of the display range in the image B, and determine the display range.

Transition of Processing in Accordance with User Operations

FIGS. 6 through 10 are diagram illustrating how processing transitions in accordance with user operations. The following is a description of how processing transitions in accordance with each user operation. Let us say that in the following, an image A1 corresponds to the reduced image 601 in FIG. 6, an image B1 corresponds to the reduced image 610 in FIG. 6, and an image B1 corresponds to the reduced image 618 in FIG. 6. We will say that the size (number of recorded pixels) of the main image of the images A1, B1, and B2 are Image A1: width 1,280 pixels, height 960 pixels
Image B1: width 680 pixels, height 480 pixels
Image B2: width 960 pixels, height 1,280 pixels (portrait)

and that image A1 and image B1 are images recording the same subject with different numbers of recording pixels.

We will further say that the size of the preview area 609 is width 320 pixels, height 240 pixels.

Case 1

A Case 1 will be described. The conditions of the Case 1 are as follows.

Operation: Image display control processing is started, three images of image A1, image B1, and image B2 are displayed as a list in the thumbnail area 603, and the image A1 is selected by the user as the first image.

Selected image: Image A1
Display scale: Unspecified

In step S503 in FIG. 5, determination is made that the image A1 has been selected, in step S506 the main image data of the image A1 which the user has selected is read in, and in step S507 determination is performed regarding whether or not the entire image can be displayed. This determination is performed according to Expressions (2) and (3). Note that with Case 1, the display scale is yet unspecified, so the display scale set beforehand as the initial setting is taken as the specified display scale. Let us say that the initial setting display scale is 25%, for example. Actually substituting values into the Expressions (2) and (3) yield Expressions (12) and (13).

$$320 \leq 320 \quad (12)$$

$$240 \leq 240 \quad (13)$$

Expressions (12) and (13) both hold true, so determination is made that the entire image can be displayed. In step S512, the entire image is reduced to 25% and displayed in the preview area 609. The flow proceeds to step S514 and awaits input of some sort. FIG. 6 shows a display example of the user interface of the image display control apparatus at this time.

Case 2

Next, a Case 2 will be described. The conditions of the Case 2 are as follows.

Operation: From the state in Case 1, the display scale is changed to 100%.
Selected image: Image A1
Display scale: 100%

In step S514, determination is made that the display scale has been changed, and the flow advances to step S515. In step S515, the display range is changed. With the present embodiment, the display range is changed accompanying change in display scale to a range wherein the position has been adjusted such that the upper left corner of the display range matches before and after changing. The display range following change in the Case 2 is a range indicated by v_p1(0, 0), v_p2(0, 240), v_p3(320, 0), v_p4(320, 240) within the main image of the image A1. Next, in step S516, determination is made regarding whether or not the entire selected image can be displayed in the preview area 609 at the changed display scale. Actually substituting the values of Case 2 into the Expressions (2) and (3) yield Expressions (14) and (15).

$$1{,}280 \leq 320 \quad (14)$$

$$960 \leq 240 \quad (15)$$

Both Expressions (14) and (15) are false, so determination is made that the entire image cannot be displayed, and the flow proceeds to step S511. In step S511, the relative position information is generated/updated to indicate the ratio of the display range changed in accordance with the change in display scale in step S514. Expression (16) shows an expression wherein the numerals for Case 2 have been substituted into the Expression (5) for calculating the center coordinates for the center of the image.

$$cX = 1{,}280/2 = 640$$

$$cY = 960/2 = 480 \quad (16)$$

The farthest point of the display range from the center of the entire image is then determined. Expression (17) shows an expression wherein the numerals for Case 2 have been substituted into the Expression (6).

$$p1\_dis = (0-640)^2 + (0-480)^2 = 409{,}600 + 230{,}400 = 640{,}000$$

$$p2\_dis = (0-640)^2 + (240-480)^2 = 409{,}600 + 57{,}600 = 467{,}200$$

$$p3\_dis = (320-640)^2 + (0-480)^2 = 102{,}400 + 230{,}400 = 332{,}800$$

$$p4\_dis = (320-640)^2 + (240-480)^2 = 102{,}400 + 57{,}600 = 160{,}000 \quad (17)$$

Of the p1_dis, p2_dis, p3_dis, p4_dis shown in Expression (17), the greatest value is p1_dis, and the corresponding point is i_p1(0, 0). The upper left point i_p1(0, 0) of the display range can be determined as the coordinates of the display range farthest from the center of the image, p_furthest(fX, fY). The ratio is the value shown in Expression (18), and this is stored as relative position information along with the information that the position is the upper left.

$$fX/\text{Image\_Width} = 0/1{,}280$$

$$fY/\text{Image\_Height} = 0/960 \quad (18)$$

Figure 7:
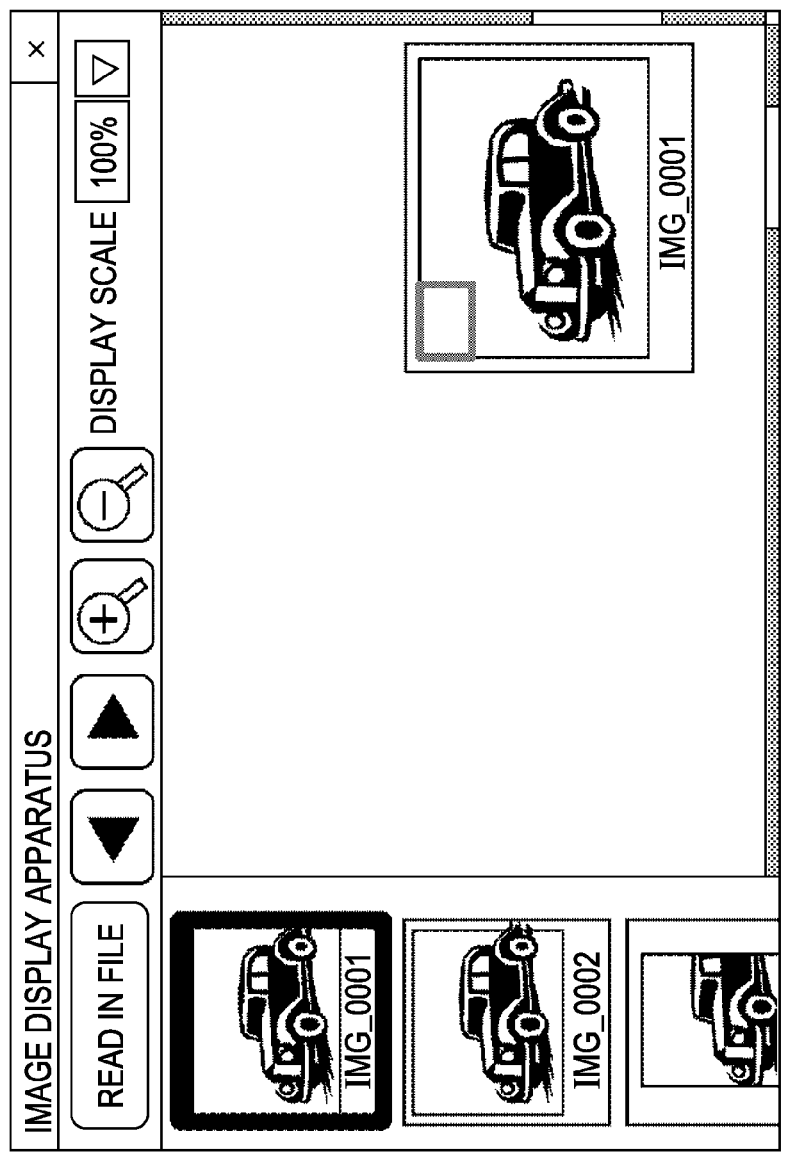
FIG. 7 is a display example of a user interface in a Case 2 with the image display control apparatus according to the first embodiment.

Next, in step S512, the display range changed in accordance with change in the display scale of the image A1 is displayed in the preview area 609. The navigator is displayed, and the flow proceeds to step S514 and awaits further input of some sort. FIG. 7 shows a display example of the user interface of the image display control apparatus at this time.

Case 3

Next, a Case 3 will be described. The conditions of the Case 3 are as follows.

Operation: From the state in Case 2, the display range is changed.
Selected image: Image A1
Display scale: 100%

In step S518, determination is made that an operation has been made to change the display range, and the flow advances to step S511. Here, will say that there is no change regarding the display scale and that the user has instructed change in only the display range, to a range v_p1(880, 560), v_p2(880, 800), v_p3(1200, 560), v_p4(1200, 800).

Next, in step S511, the relative position information is updated to relative position information regarding the changed display range. The image is image A1, so the center coordinates are the same as the value shown in Expression (16).

The point of the display range which is the farthest from the center of the entire image is determined. Expression (19) shows an expression wherein the numerals for Case 3 have been substituted into the Expression (6).

$$p1\_dis=(880-640)^2+(560-480)^2=57,600+6,400=64,000$$

$$p2\_dis=(880-640)^2+(800-480)^2=57,600+102,400=160,000$$

$$p3\_dis=(1,200-640)^2+(560-480)^2=313,600+6,400=320,000$$

$$p4\_dis=(1,200-640)^2+(800-480)^2=313,600+102,400=422,400 \quad (19)$$

The greatest value is p4_dis, and the corresponding point is i_p4(1,200, 800). The lower right point i_p4(1,200, 800) of the display range can be determined as the coordinates of the display range farthest from the center of the image, p_furthest (fX, fY). The ratio is the value shown in Expression (20), and this is stored as relative position information along with the information that the position is the lower right.

$$fX/\text{Image\_Width}=1,200/1,280$$

$$fY/\text{Image\_Height})=800/960 \quad (20)$$

Figure 8:
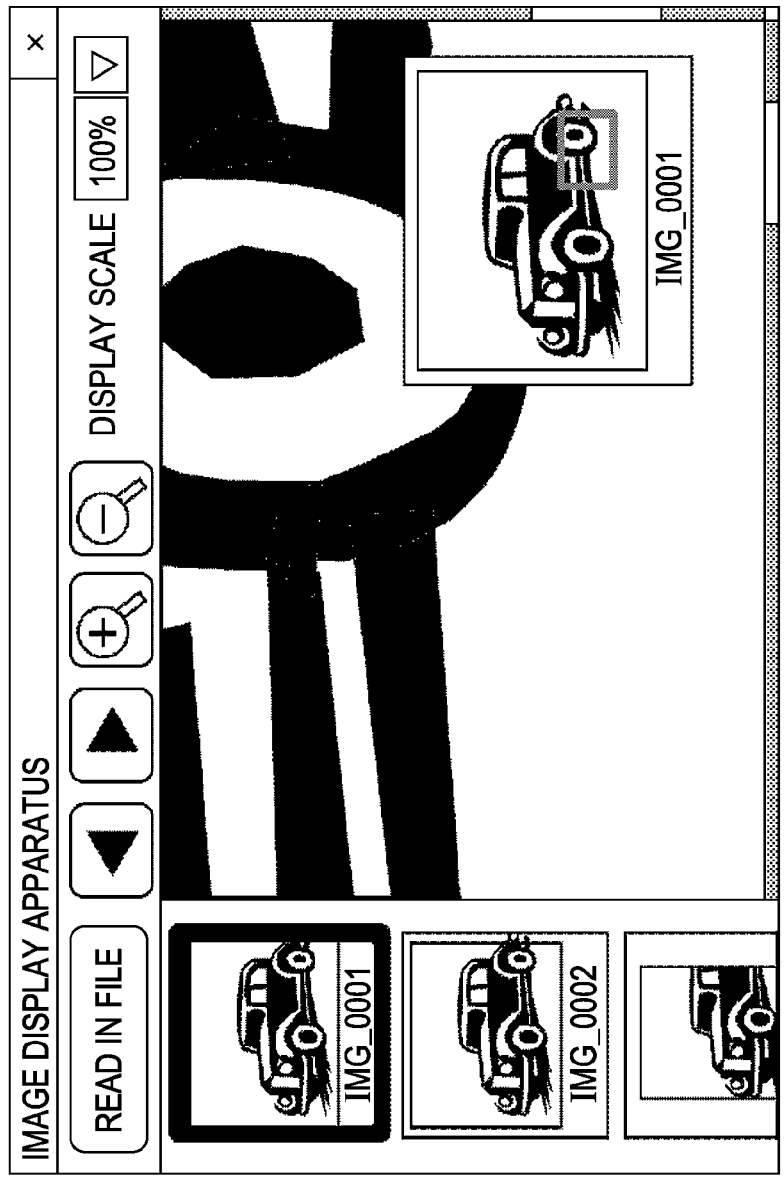
FIG. 8 is a display example of a user interface in a Case 3 with the image display control apparatus according to the first embodiment.

Next, in step S512, the changed display range is displayed in the preview area 609. The navigator is displayed, and the flow proceeds to step S514 and awaits further input of some sort. FIG. 8 shows a display example of the user interface of the image display control apparatus at this time.

Case 4

Next, a Case 4 will be described. The conditions of the Case 4 are as follows.

Operation: From the state in Case 3, the image B1 is selected without changing the display scale
Selected image: Image B1
Display scale: 100%

In step S519, determination is made that an image switching operation has been made, and the flow proceeds to steep S505. In step S505, the selection frame 602 of the thumbnail 603 is moved from the reduction image 601 (the reduced image of image A1) to the reduction image 610 (the reduced image of image B1), and in step S506 the main image data of the image B1 is read in. In the following step S507, determination is made from the above-described expressions (2) and (3) that the entire image cannot be displayed, and the flow proceeds to step S508. In step S508, the relative position information is already stored as described with Case 3, so the flow advances to step S510.

In step S510, the display range is determined based on the relative position information. Substituting the values for Case 4 into Expression (9) yields the ibX1 and ibY1 for image B1 as shown in Expression (21)

$$ibX1=fbX=640\times1,200/1,280=600$$

$$ibY1=fbY=480\times800/960=400 \quad (21)$$

and substituting the values for Case 4 into Expression (11) yields the ibX0 and ibY0 for image B1 as shown in Expression (22).

$$ibX0=600-(320\times100/100)=280$$

$$ibY0=400-(240\times100/100)=160 \quad (22)$$

As described above, the display range of the image B1 is found to be i_p1(280, 160), i_p2(280, 400), i_p3(600, 160), i_p4(600, 400). Here, the relative position information is not changed, the flow proceeds to step S512, and the range of the main image of the image B1 indicated by i_p1, i_p2, i_p3, i_p4 as determined above is displayed in the preview area 609 at the specified display scale (100% in this case). The navigator is displayed, and the flow proceeds to step S514 and awaits further input of some sort.

Figure 9:
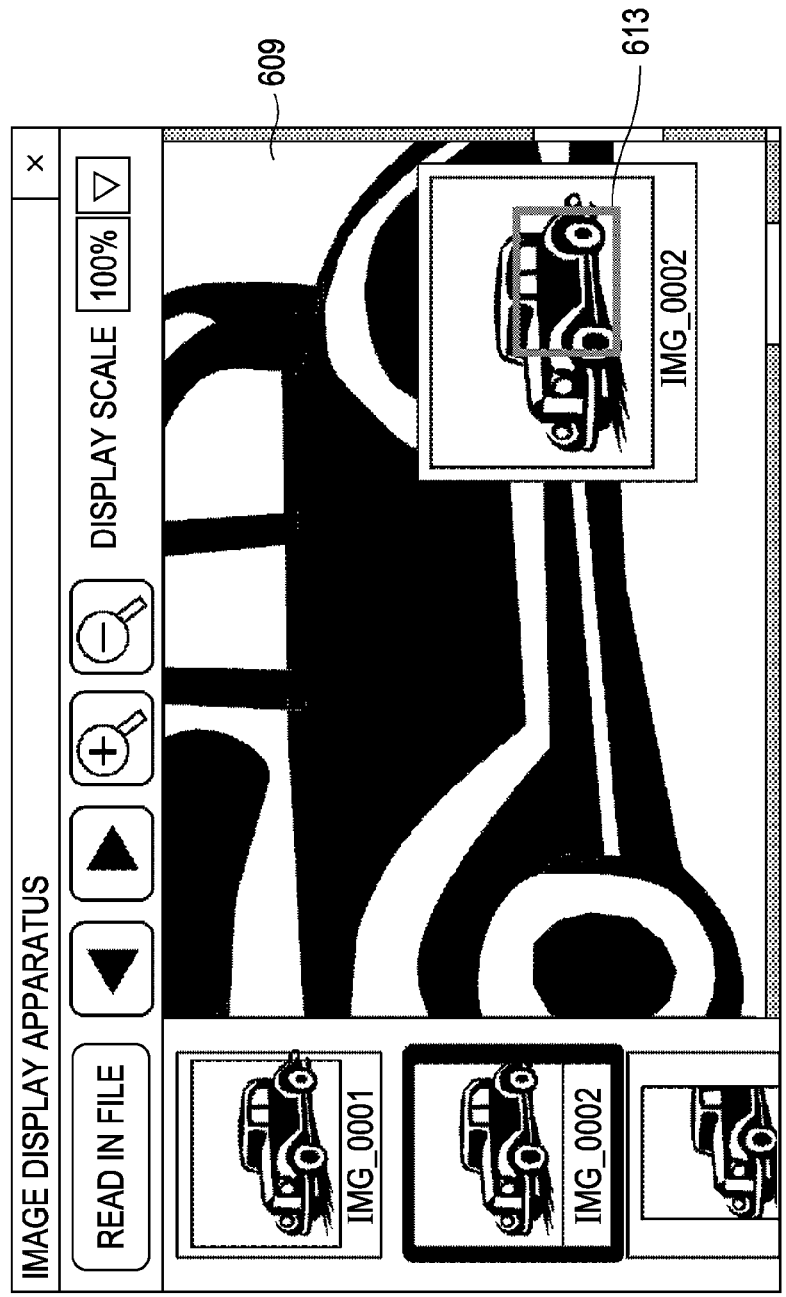
FIG. 9 is a display example of a user interface in a Case 4 with the image display control apparatus according to the first embodiment.

FIG. 9 shows a display example of the user interface of the image display control apparatus at this time. The ratio of the lower right corner of the portion of the image B1 displayed in the preview area as to the entire image B1 matches the ratio of the point (lower right corner) of the display range in Case 3 regarding which the relative position information has been generated farthest from the center of the entire image A1, as to the entire image A1. The image A1 and image B1 are of a different number of recorded pixels but are images recording the same subject, so with the displays in Case 3 and Case 4, the same portion of the subject can be confirmed for at least around the lower right, with the ratio matching. Further, due to a later-described reason, the frame 613 indicating the display range does not extend out from the entire image B1, and allows the range of the image B1 to be confirmed over the entirety of the preview area 609. Thus, at the time of switching from the image A1 to the image B1 of a different image size without changing the display scale, the range corresponding to the display range of the image A1 can be confirmed without extending out from the image B1.

Case 5

Next, a Case 5 will be described. The conditions of the Case 5 are as follows.

Operation: From the state in Case 4, the image B2 (portrait) is selected without changing the display scale.
Selected image: Image B2
Display scale: 100%

In step S519, determination is made that an image switching operation has been made, and the flow proceeds to steep S505. In step S505, the selection frame 602 of the thumbnail 603 is moved from the reduction image 610 (the reduced image of image B1) to the reduction image 618 (the reduced image of image B2), and in step S506 the main image data of the image B2 is read in. In the following step S507, determination is made from the above-described expressions (2) and (3) that the entire image cannot be displayed, and the flow proceeds to step S508. In step S508, the relative position information is already stored as described with Case 3, so the flow advances to step S510.

In step S510, the display range is determined based on the relative position information. Substituting the values for Case 5 into Expression (9) yields the ibX1 and ibY1 for image B2 as shown in Expression (23).

$$ibX1=fbX=960\times1,200/1,280=900$$

$$ibY1=fbY=1,280\times800/960=1,066.6666 \quad (23)$$

Now, ibY1 cannot be divided out, and accordingly is rounded out to 1,066. Note that the values of the coordinates must take on integer values, being the number of pixels of the image, but any method of rounding off is permissible as long as within the range of the main image.

Substituting the values for Case 5 into Expression (11) yields the ibX0 and ibY0 for image B2 as shown in Expression (24).

$$ibX0=900-(320\times100/100)=580$$

$$ibY0=1,066-(240\times100/100)=826 \quad (24)$$

As described above, the display range of the image B2 is found to be i_p1(580, 826), i_p2(580, 1066), i_p3(900, 826), i_p4(900, 1,066). Here, the relative position information is not changed, the flow proceeds to step S512, and the range of the main image of the image B2 indicated by i_p1, i_p2, i_p3, i_p4 as determined above is displayed in the preview area 609 at the specified display scale (100% in this case). The navigator is displayed, and the flow proceeds to step S514 and awaits further input of some sort.

FIG. 10 shows a display example of the user interface of the image display control apparatus at this time. The ratio of the lower right corner of the portion of the image B2 displayed in the preview area 609 as to the entire image B2 matches the ratio of the point (lower right corner) of the display range in Case 3 regarding which the relative position information has been generated farthest from the center of the entire image A1, as to the entire image A1. Further, this also matches the ratio of the lower right corner of the portion of the image B1 displayed in the preview area as to the entire image B1 in Case 4. This is because the display range in both Case 4 and Case 5 is determined based on the relative position information generated in Case 3. Further, due to a later-described reason, the frame 613 indicating the display range does not extend out from the entire image B2, and allows the range of the image B2 to be confirmed over the entirety of the preview area 609. Thus, at the time of switching between images A1, B1, and B2, without changing the display scale, the range corresponding to each can be confirmed without extending out from the respective images.

Now, as can be seen from Expression (23), with the display range determining processing based on the relative position information in case 5, there will be situations wherein a value cannot be divided out, and accordingly has to be rounded off, meaning that there will be rounding error. If relative position information is generated based on the display range of this image, the rounding error will lead to a ratio different from the relative position information generated in Case 3 being generated. However, in Case 5, no operations for changing the display range have been performed, and accordingly the relative position information is not updated, as described in step S510 in FIG. 5. Accordingly, at the time of switching to yet another image without performing an operation for changing the display range from that in Case 5, determination of the display range is performed based on the relative position information generated at the time in Case 3, and no error greater than 1 pixel occurs as to the ratio indicating the relative position information.

As described above, with the present embodiment, at the time of displaying images one after another with the scale based on the display resolution fixed, a corresponding range can be displayed for images of different sizes, and for images of different orientation (landscape/portrait), and accordingly images can be easily compared.

Reason Why Point of Display Range Farthest From Center of Image is Taken as Reference The reason why the point of the display range that is farthest from the center of the image is taken as a reference will be described with reference to FIGS. 12A through 12E. FIGS. 12A through 12E are conceptual diagrams explaining a case wherein images are switched using a point of the display range that is the closest to the center of the image, and a case wherein images are switched using a point of the display range that is the farthest from the center of the image.

In FIGS. 12A through 12E, a rectangle 1201 represents the size of the entire image of image A1. A rectangle 1202 represents the size of the entire image of image B1 which is smaller in size (number of recorded pixels) than the image A1. A rectangle 1203 represents the size of the entire image of image B2 which has the same number of recorded pixels as the image A1 but the orientation is different, i.e., is portrait. A rectangle 1204 represents a display range displayed in the preview area 609 for the images A1, B1, and B2. In FIGS. 12A through 12E, the values have the following meanings.

Image_Width: The width of the entire main image of image A1

Image_Height: The height of the entire main image of image A1

ImageB1_Width: The width of the entire main image of image B1

ImageB1_Height: The height of the entire main image of image B1

ImageB2_Width: The width of the entire main image of image B2

Figure 12A:
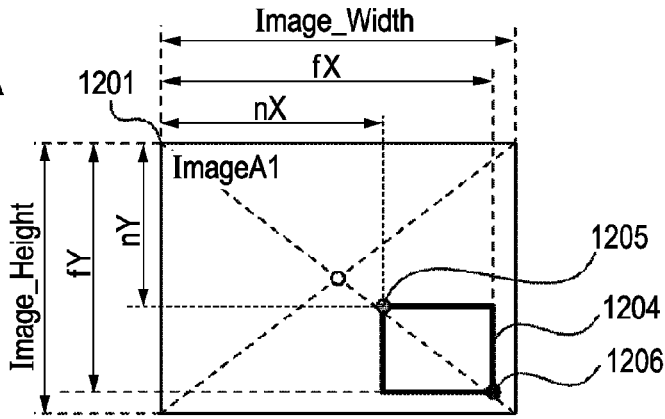
FIGS. 12A through 12E are conceptual diagrams explaining the reason why the display range can be appropriately determined with the method for generating relative position information according to the first embodiment.

ImageB2_Height: The height of the entire main image of image B2 nX: The x-coordinate of the point of the display range of the image A1 nearest to the center of the image A1 nY: The y-coordinate of the point of the display range of the image A1 nearest to the center of the image A1 fX: The x-coordinate of the point of the display range of the image A1 farthest from the center of the image A1 fY: The y-coordinate of the point of the display range of the image A1 farthest from the center of the image A1 nX1: The x-coordinate on the image B1 of a point calculated from relative position information generated based on nX nY1: The y-coordinate on the image B1 of a point calculated from relative position information generated based on nY fX1: The x-coordinate on the image B1 of a point calculated from relative position information generated based on fX fY1: The y-coordinate on the image B1 of a point calculated from relative position information generated based on fY nX2: The x-coordinate on the image B2 of a point calculated from relative position information generated based on nX nY2: The y-coordinate on the image B2 of a point calculated from relative position information generated based on nY fX2: The x-coordinate on the image B2 of a point calculated from relative position information generated based on fX fY2: The y-coordinate on the image B2 of a point calculated from relative position information generated based on fY FIG. 12A is a diagram illustrating points of a display range 1204 of the image A1 that are the nearest to and the farthest from the center of the image A1. Point 1205 indicates the point of the display range 1204 of the image A1 that is closest to the center. Point 1206 indicates the point of the display range 1204 of the image A1 that is farthest from the center. We will now consider generating relative position information for this display range 1204 of the image A1.

Figure 12B:
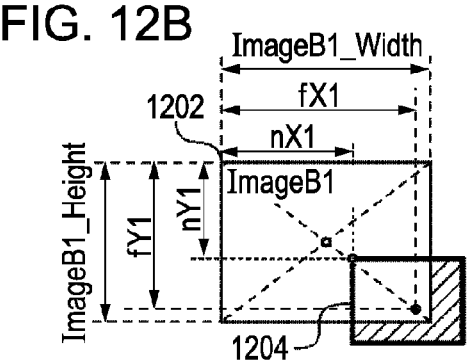

FIG. 12B illustrates a display range in the event that relative position information has been generated with the point 1205 (point of the display range of the image A1 that is closest to the center) in the image A1 as a reference, and then switched to image B1. That is to say, this satisfies the following Expression (25).

$$nX1/\text{Image}B1\_\text{Width}=nX/\text{Image\_Width}$$

$$nY1/\text{Image}B1\_\text{Height}=nY/\text{Image\_Height} \quad (25)$$

In the event of maintaining the ratio of the upper left coordinate of the display range as to the size of the image with the point 1205 closest to the center of the image A1 as a reference, and displaying the image B1 in the preview area 609, there is the possibility that the display range 1204 will extend out from the image B1, as shown in FIG. 12B. Nothing will be displayed in the preview area 609 for the portion of the display range 1204 that has extended out from the image B1 (the hatched portion).

Figure 12C:
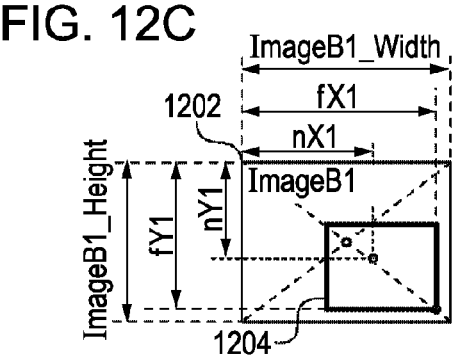
Figure 12D:
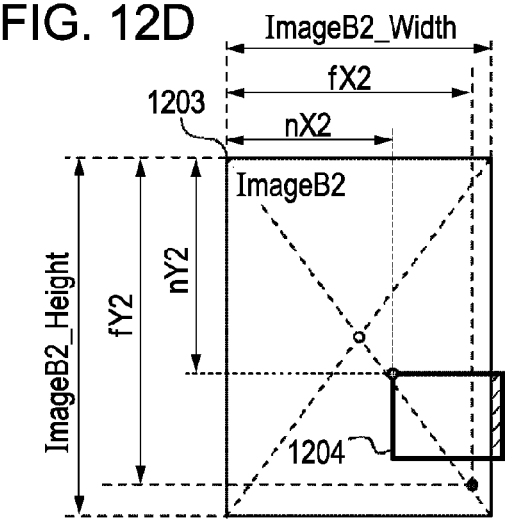

FIG. 12D illustrates a display range in the event that relative position information has been generated with the point 1205 (point of the display range of the image A1 that is closest to the center) in the image A1 as a reference, and then switched to image B2. That is to say, this satisfies the following Expression (26).

$$nX2/ImageB2\_Width = nX/Image\_Width$$

$$nY2/ImageB2\_Height = nY/Image\_Height \quad (26)$$

In the event of maintaining the ratio of the upper left coordinate of the display range as to the size of the image with the point 1205 closest to the center of the image A1 as a reference, and displaying the image B2 in the preview area 609, there is the possibility that the display range 1204 will extend out from the image B1, as shown in FIG. 12D. Nothing will be displayed in the preview area 609 for the portion of the display range 1204 that has extended out from the image B2 (the hatched portion).

On the other hand, FIG. 12C illustrates a display range in the event that relative position information has been generated with the point 1206 (point of the display range of the image A1 that is the farthest from the center) in the image A1 as a reference, and then switched to image B1. That is to say, this satisfies the following Expression (27).

$$fX1/ImageB1\_Width = fX/Image\_Width$$

$$fY1/ImageB1\_Height = fY/Image\_Height \quad (27)$$

In the event maintaining the ratio as with the size of the image A1 with the point 1206 that is the farthest from the center of the image A1 as a reference, and displaying image B1 on the preview area 609, the display range 1204 does not extend out from the image B2, as shown in FIG. 12C.

Figure 12E:
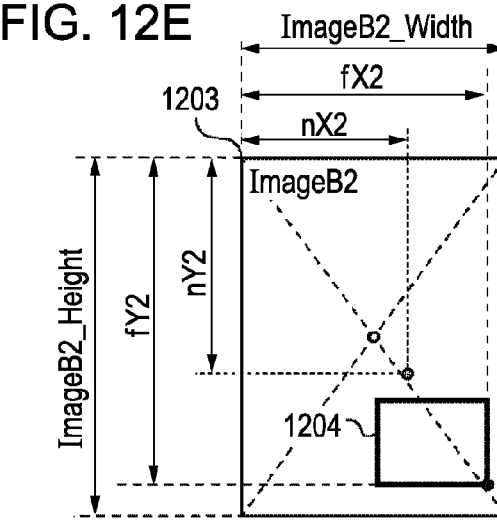

Also, FIG. 12E illustrates a display range in the event that relative position information has been generated with the point 1206 (point of the display range of the image A1 that is the farthest from the center) in the image A1 as a reference, and then switched to image B2. That is to say, this satisfies the following Expression (28).

$$fX2/ImageB2\_Width = fX/Image\_Width$$

$$fY2/ImageB2\_Height = fY/Image\_Height \quad (28)$$

In the event maintaining the ratio as with the size of the image A1 with the point 1206 that is the farthest from the center of the image A1 as a reference, and displaying image B2 on the preview area 609, the display range 1204 does not extend out from the image B2, as shown in FIG. 12C. In the cases shown in FIGS. 12C and 12E, the images B1 and B2 can be displayed using the entire region of the preview area 609, and the user can make configuration of a wider range than with FIGS. 12B and 12D.

In this way, at the time of switching images, the ratio of the coordinates of the display range farthest from the center of the image before switching as to the size of the image, and the ratio of the coordinates of a point of the display region of the image following switching corresponding to the point used for calculating the ratio before switching as to the size of the image, are matched. Accordingly, the probability of the display range extending out from the image can be reduced, except for cases under certain conditions, such as the size (in pixels) of the preview area 609 being larger than the size (in pixels) of the entirety of the scale-changed image to be displayed.

Now, in the event that determination is made that the display range of the switched image will extend out from the image, a method for handling this without using the method according to the present invention can be conceived, wherein coordinates are adjusted to keep the display range within the image. For example, in the event that the display range has extended out of the image as shown in FIG. 12B, a method can be conceived to adjust the coordinates by an amount corresponding to the amount extending out (the hatched portion), so as to keep the display range within the image. However, the display range will be offset from the corresponding position before switching by an amount corresponding to the amount of coordinate adjustment. With the method according to the present embodiment, there is no need to perform processing for correction when extending out, and also, there is no problem of the display range being offset.

As described above, according to the present embodiment, relatively corresponding positions can be taken as display ranges at the time of switching between images with different sizes with the display scale fixed, and also the probability of a position outside of the image being taken as a display range can be reduced.

Second Embodiment

Case Where Display Region is Near Center of Image

With the first embodiment of the present invention, in step S511 in FIG. 5 the relative position information is generated with the coordinates of the display region farthest from the center of the image as a reference. However, with the method in the first embodiment, in the event that the display region is near the center of the image, there is the possibility that the user may experience a sensation of shifting at the time of switching over the image to be displayed, as if the display ranges do not correspond.

FIGS. 13A through 13D are conceptual diagrams illustrating a case wherein the display range is near the center of the image. A rectangle 1301 indicates the size of the entire image of an image A. A rectangle 1302 indicates the size of the entire image of an image B which is of different size from the image A. A rectangle 1303 indicates a display range in which the image A and image B are each displayed in the preview area. The values in FIGS. 13A through 13D are as follows.

Figure 13A:
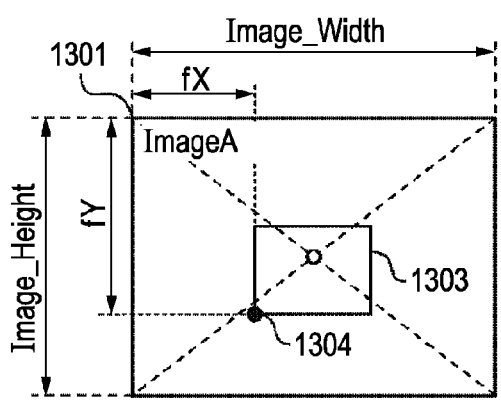
FIGS. 13A through 13D are conceptual diagrams illustrating a method for generating relative position information according to a second embodiment, and explaining the reason why the display range can be appropriately determined with the method for generating relative position information according to the second embodiment.

Image_Width: The width of the entire image of image A
Image_Height: The height of the entire image of image A
ImageB_Width: The width of the entire image of image B
ImageB_Height: The height of the entire image of image B
fX: The x-coordinate of the point of the display range of the image A farthest from the center of the image A
fY: The y-coordinate of the point of the display range of the image A farthest from the center of the image A
ibX0: The x-coordinate of the lower left point of the display range of the image B
ibY1: The y-coordinate of the lower left point of the display range of the image B
iAveX: The x-coordinate of the center of the display range of the image A
iAveY: The y-coordinate of the center of the display range of the image A
ibAveX: The x-coordinate on the image B calculated from relative position information with iAveX as a reference
ibAveY: The y-coordinate on the image B calculated from relative position information with iAveY as a reference FIG. 13A illustrates a point 1304 of a display range 1303 of the image A which is the farthest from the center of the image A. Note that in FIG. 13A, the difference in the distance between the center of the image A and the other corners (upper left, upper right, lower right) of the display range 1303 as to the distance between the center of the image A and the point 1304 which is the farthest from the center of the image A, is smaller as compared with the case shown in FIG. 12A.

Figure 13B:
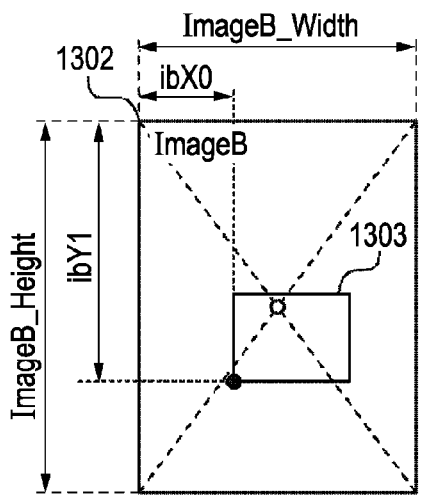

FIG. 13B illustrates the display range in a case wherein the point 1304 in the image A (the point of the display range of image A that is the farthest from the center) is used as a reference to generate relative position information, and the image has been switched to image B. That is to say, the display range satisfies the following Expression (29).

$$ibX0/ImageB\_Width=fX/Image\_Width$$

$$ibY1/ImageB\_Height=fY/Image\_Height \qquad (29)$$

Figure 13C:
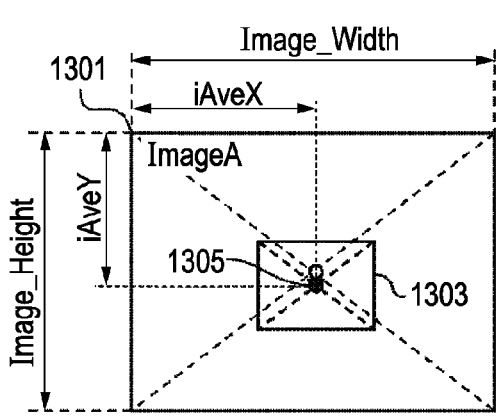
Figure 13D:
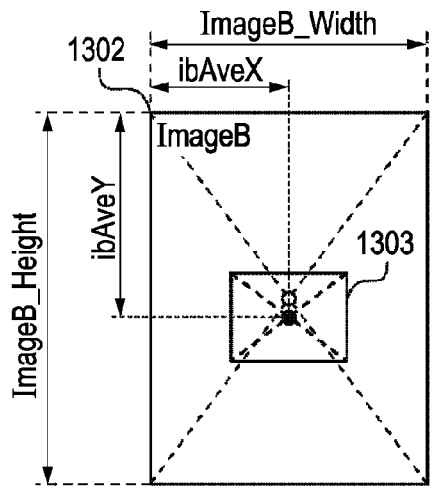

In comparison with the case in FIG. 13A, the user will have a sensation that the display range has shifted downward from around the center of the image. This is because, in FIG. 13A where the relative position information has been generated, the difference in the distance between the center of the image A and the other corners (upper left, upper right, lower right) of the display range 1303 as to the distance between the center of the image A and the point 1304 which is the farthest from the center of the image A, is relatively small. Accordingly, with the present embodiment, the calculation method of ratio in such a case will be changed, and the ratio is calculated taking as reference the average coordinates of the coordinates on the edge of the display range within a threshold value in distance from the center of the image up to the farthest point 1304 from the center of the image, thereby alleviating the sensation of offset. FIGS. 13C and 13D are example of alleviating the sensation of offset, and will be described in detail later.

Method of Generating Relative Position Information with Second Embodiment

The following is a description of a calculation method of the relative position information in a case wherein the display range is near the center of the image, with reference to FIG. 13C. First, determination is made regarding whether or not the distance to the second power between the center of the image and each point (p1_dis, p2_dis, p3_dis, p4_dis) is within a threshold value. If so, determination is made that around the center of the image is being displayed. This threshold value may be a predetermined optional value. Also, this threshold value may be variable depending on the size of the image at the time of generating ratio information. For example, in an image which is 480 pixels wide and 640 pixels high, difference of 100 pixels can be said to be a great difference, but in an image which is 4,800 pixels wide and 6,400 pixels high, difference of 100 pixels can be said to be a small difference.

With the present embodiment, the length of the diagonal lines of the display range to the second power will be taken as the threshold value max_dis, as one example. The calculation method of the threshold value max_dis is shown in Expression (30).

$$\max\_dis=(iX0-iX1)^2+(iY0-iY1)^2 \qquad (30)$$

Taking the distance between the center of the image and the point of the display range which is farthest from the center of the image as i_furthest, whether or not the coordinates of the center of the image are within the display range can be determined by Expression (31).

$$i\_furthest^2<\max\_dis \qquad (31)$$

In the event that Expression (26) is true, this means that the coordinates of the center of the image are within the display range. In this case, the coordinates of the center of the display range is taken as the reference point for generating the relative position information. Point 1305 in FIG. 13C illustrates the coordinates of the center of the display range.

An example of the calculation method of the coordinates of the center of the display range i_pave(iAveX, iAveY) is shown in Expression (32).

$$iAveX=(iX0+iX1)/2$$

$$iAveY=(iY0+iY1)/2 \qquad (32)$$

As the coordinates position information thereof, i_basePos (posX, posY) which indicates a position viewed from the upper left corner of the display range is calculated as shown in Expression (33).

$$posX=iAveX-iX0$$

$$posY=iAveY-iY0 \qquad (33)$$

This i_basePos(posX, posY) and a ratio of the coordinates of the center of the display range i_pave(iAveX, iAveY) as to the entire image (iAveX/Image_Width, iAveY/Image_Height) are stored as relative position information.

In the determination regarding whether or not coordinates of the center of the image are included in the display range using Expression (31), in the event that determination is made that coordinates of the center of the image are not included, the relative position information described with the first embodiment is stored rather than the above-described relative position information. That is to say, the ratio (fX/Image_Width, fY/Image_Height) of the farthest coordinates of the display range p_furthest(fX, fY) as to the entire image, and position information (one of upper left, lower left, upper right, lower right), are stored as relative position information. This is because in the event that the center of the image is not included in the display range, that is to say, in the event that the display range is toward the edge of the image, the sensation of offset does not readily occur even if the display range of the switched image is determined based on the relative position information described with the first embodiment. Not only that, determining the display range of the switched image based on the relative position information described with the relative position information described with the second embodiment increases the probability of the display range extending out from the image.

Display Range Determining Method Based on Relative Position Information According to Second Embodiment A method for calculating the display range from the relative position information made up of the above-described i_basePos(posX, posY) and ratio (iAveX/Image_Width) of the coordinates i_pave(iAveX, iAveY) of the center of the display range as to the entire image, will be described.

A case wherein an image A regarding which relative position information has been generated is switched to another image B (width: ImageB_Width, height: ImageB_Height) while keeping the display scale will be described. First, the point iB_pave(ibAveX, ibAveY) in the image B corresponding to the point taken as the reference at the time of generating the relative position information with image A is obtained by Expression (34)

$$ibAveX/ImageB\_Width=iAveX/Image\_Width$$

$$ibAveY/ImageB\_Height=iAveY/Image\_Height \qquad (34)$$

whereby Expression (35)

$$ibAveX=ImageB\_Width \times iAveX/Image\_Width$$

$$ibAveY=ImageB\_Height \times iAveY/Image\_Height \qquad (35)$$

can be obtained.

Based on the obtained coordinates iB_pave(ibAveX, ibAveY) of the position on the image B which the relative position information indicates, a range which fits into the preview area 609 is determined as the display range. Let us say that the coordinates of each corner of the display range of the entire main image of the image B displayed in the preview area 609 are as follows.
iB_p1(ibX0, ibY0): Coordinates of upper left corner
iB_p2(ibX0, ibY1): Coordinates of lower left corner
iB_p3(ibX1, ibY0): Coordinates of upper right corner
iB_p4(ibX1, ibY1): Coordinates of lower right corner Expression (36) can be obtained from the i_basePos(posX, posY) stored as the relative position information.

$$ibX0 = ibAveX - posX$$

$$ibX1 = ibX0 + (ViewArea\_W \times 100/View\_Mag)$$

$$ibY0 = ibAveY - posY$$

$$ibX1 = ibY0 + (ViewArea\_H \times 100/View\_Mag) \quad (36)$$

With the above method, the corners iB_p1, iB_p2, iB_p3, iB_p4 of the display range in the image B are calculated, and the display range is determined. The display range of the image B determined thus is shown in FIG. 13D. The sensation of offset can be alleviated as compared with the case in FIG. 13B wherein the point 1304 in the image A (the point of the display range of image A that is the farthest from the center) is taken as a reference and relative position information is generated, and the image is switched to image B.

As described above, according to the present embodiment, the ratio calculation method is changed only in the event that near the center of the image is being displayed, whereby the sensation of offset of the display range can be reduced. Also, at the time of displaying near the edge of the image, the coordinates of the display range farthest from the center are taken as a reference, so the display range does not readily extend off the image.

Figure 14A:
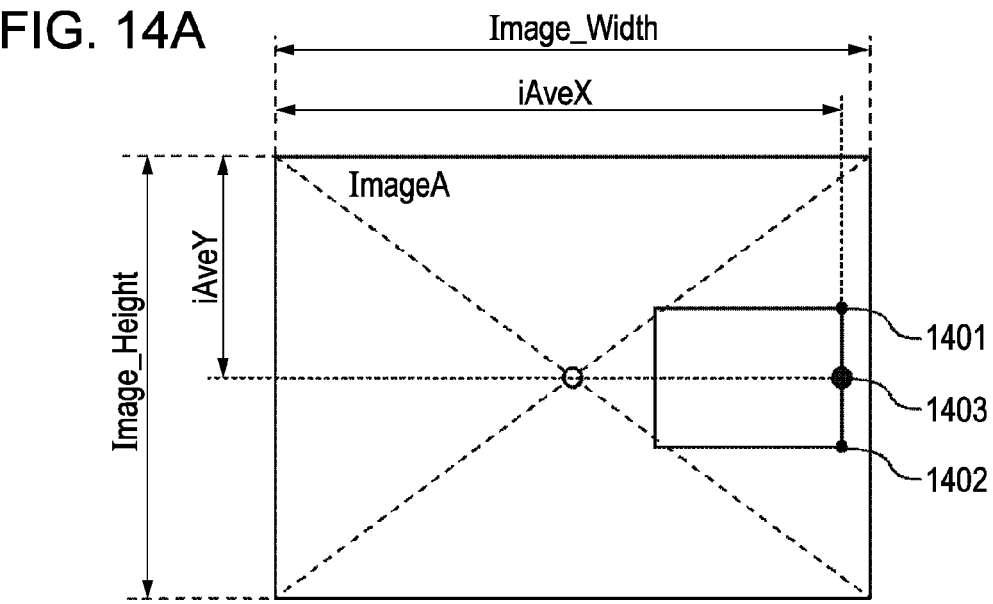
FIGS. 14A and 14B are conceptual diagrams illustrating another method for generating relative position information according to the second embodiment.
Figure 14B:
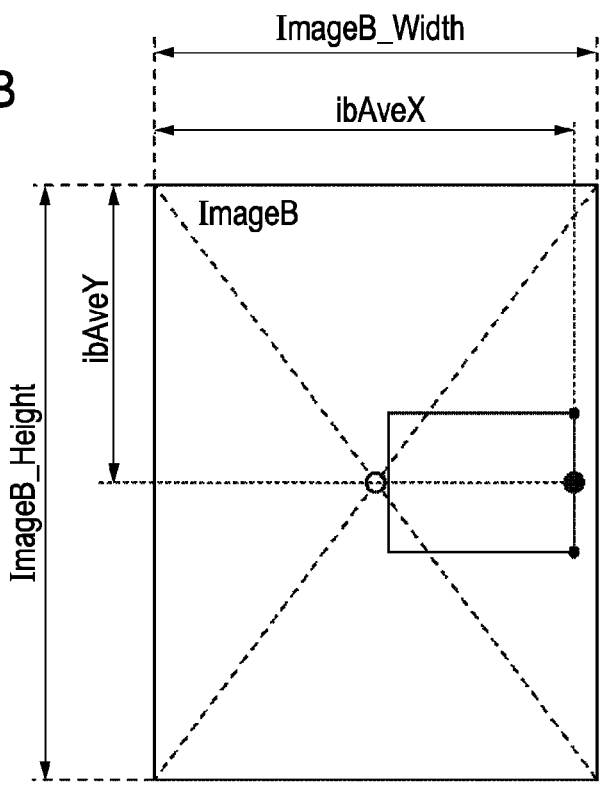

Note that while description has been made regarding a case wherein the ratio is calculated using as a reference the center of the four corners of the display range in the event that the display range of the image for generating the relative position information is displayed near the center of the image, the ratio is not restricted to the center of the four corners, and may be calculated relating to the center of two or more corners. That is to say, of the distances from the center of the image to the corners of the display range, in the event that there are two or more corners of which the difference in distance to the center of the image is relatively small as compared with the farthest point from the center of the image, including the farthest point, the center of the corners within the threshold are used to generate the relative position information. FIGS. 14A and 14B illustrate an example of such a case. With image shown in FIG. 14A regarding which relative position information is to be generated, the display range is not near the center of the image, but there are two points of the display range, point 1401 and 1401, which can be said to be farthest from the center of the display range. The relative position information is generated with the center 1403 of these two points as a reference. FIG. 14B shows and example of having switched the image with this relative position information. The values in FIGS. 14A and 14B are as follows, and satisfy Expression (37)
Image_Width: Width of entire main image of image A
Image_Height: Height of entire main image of image A
ImageB_Width: Width of entire main image of image B
ImageB_Height: Height of entire main image of image B
iAveX: x-coordinates of center 1403 of point 1401 and point 1402
iAveY: y-coordinates of center 1403 of point 1401 and point 1402
ibAveX: x-coordinates on image B calculated by relative position information generated taking iAveX as reference
ibAveY: y-coordinates on image B calculated by relative position information generated taking iAveY as reference $$ibAveX/ImageB\_Width = iAveX/Image\_Width$$

$$ibAveY/ImageB\_Height = iAveY/Image\_Height \quad (37)$$

Generating relative position information in this way causes less sense of offset of the image in the vertical direction as compared with generating the relative position information taking as a reference one point the farthest from the center of the image, of the display range of the image regarding which the relative position information is to be generated.

Also, an arrangement may be made wherein, in the event that the display range of the image regarding which the relative position information is to be generated is near the center of the image, the reference point iB_pave(ibAveX, ibAveY) is determined upon weighting based on the focus position and face detection position recorded in the attributes information of the image. This will increase ease-of-use for users who want to first confirm the focus position or position where a face is. For example, Expression (38) illustrates an example of a calculation method of coordinates serving as a reference in the event that a face detection position center p_face (face_X, face_Y) is included in the display range.

$$iAveX = (iX1 - iX0)\_\{(face\_X - iX0)/(iX1 - iX0)\} + iX0$$

$$iAveY = (iY1 - iY0) \times \{(face\_Y - iY0)/(iY1 - iXY)\} + iY0 \quad (38)$$

Note that portions with brightness, portions with high contrast, and so forth, may be weighted in the same way if the coordinates can be found. This enables enlarged confirmation of whether bright portions have become saturated, whether portions with high contrast are the desired color, and so forth, improving ease-of-use.

Third Embodiment

Figure 15:
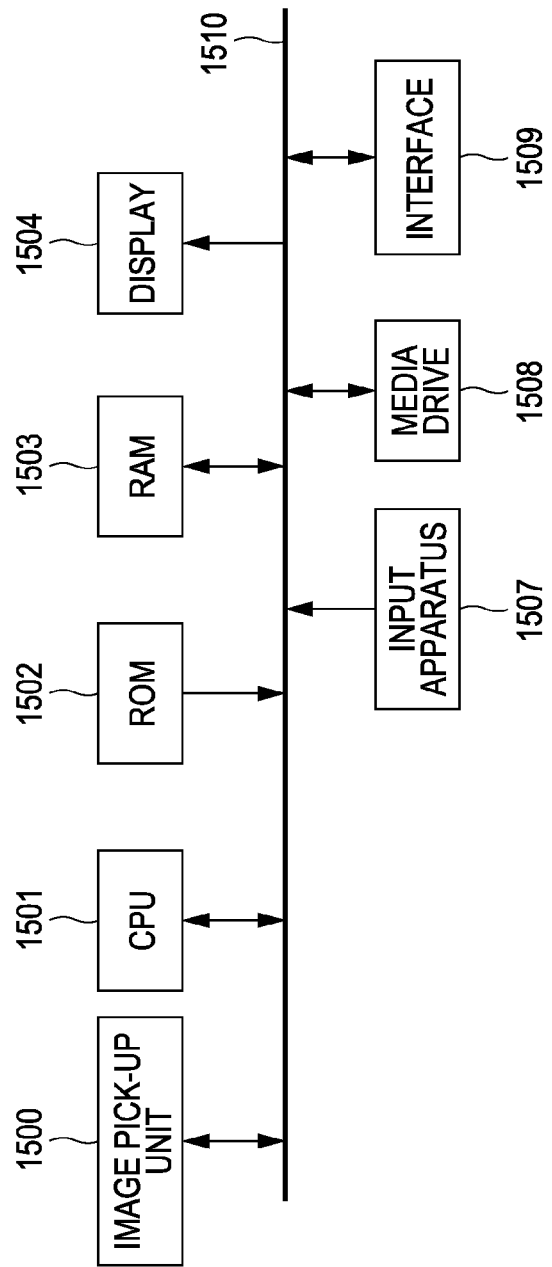
FIG. 15 is a block diagram illustrating the schematic configuration of a digital camera which is an example of an image display control apparatus according to a third embodiment.
Figure 16:
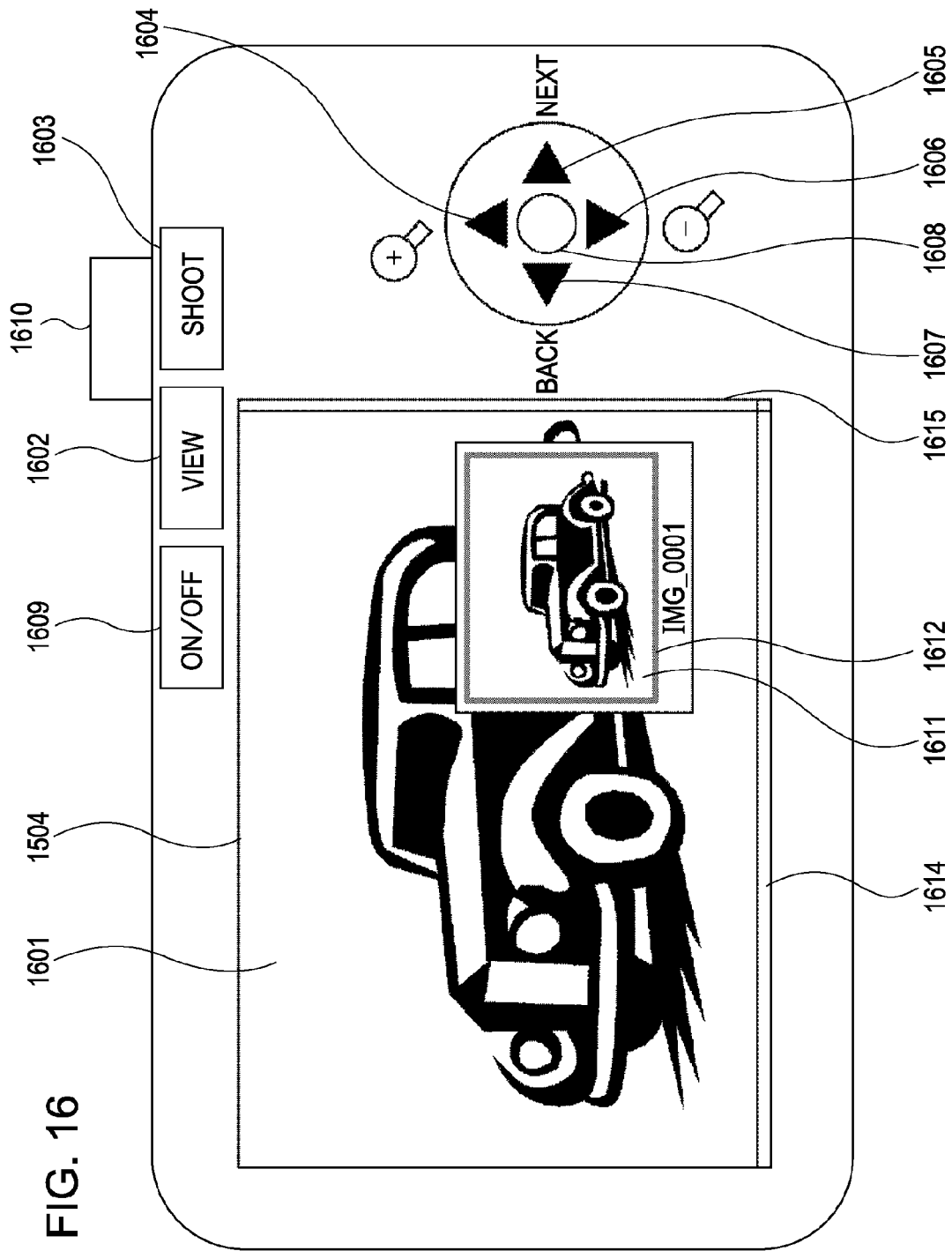
FIG. 16 is a display example of a user interface with the digital camera which is an example of the image display control apparatus according to the third embodiment.
Figure 17:
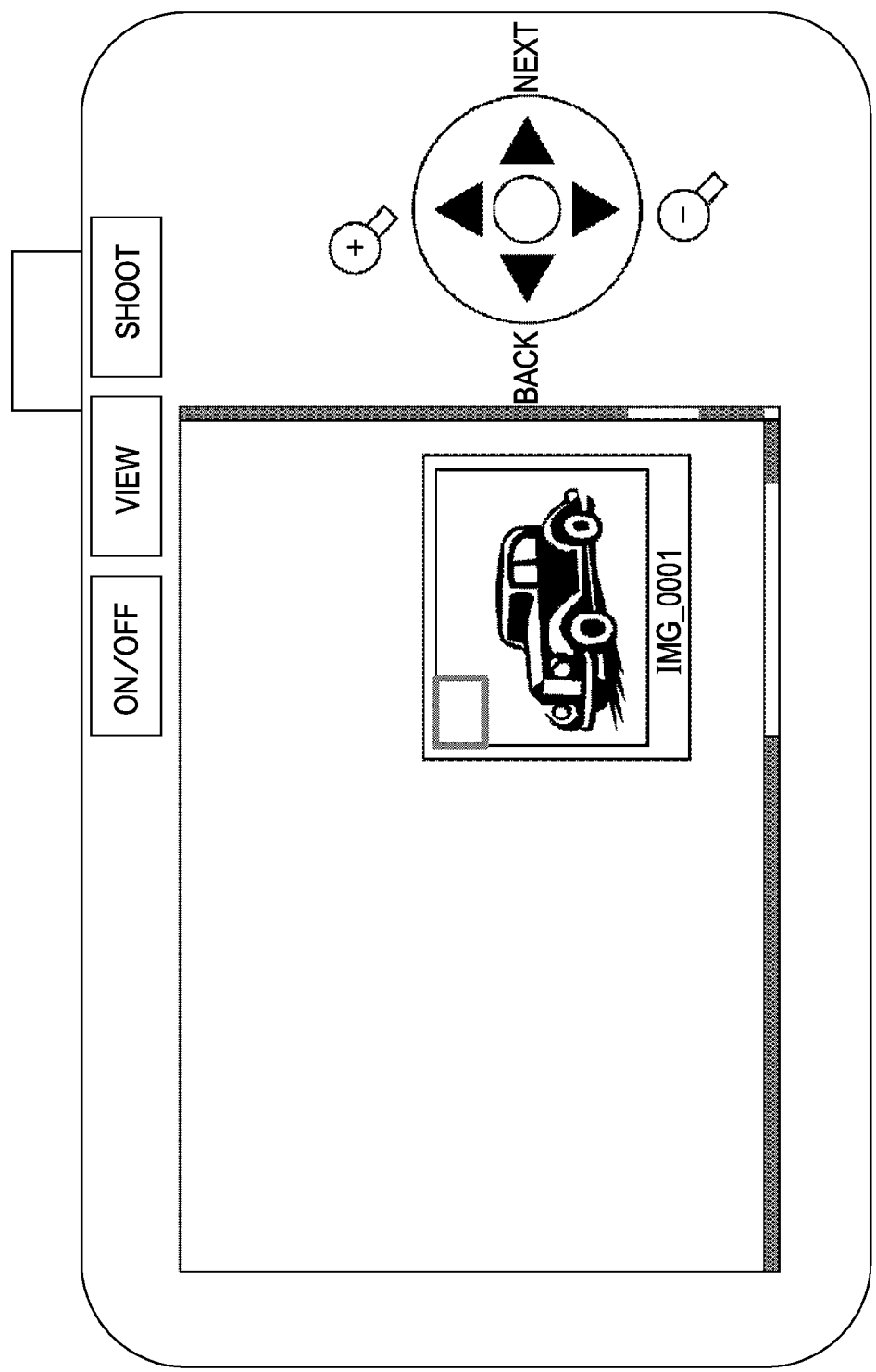
FIG. 17 is a display example of a user interface with the digital camera which is an example of the image display control apparatus according to the third embodiment.
Figure 18:
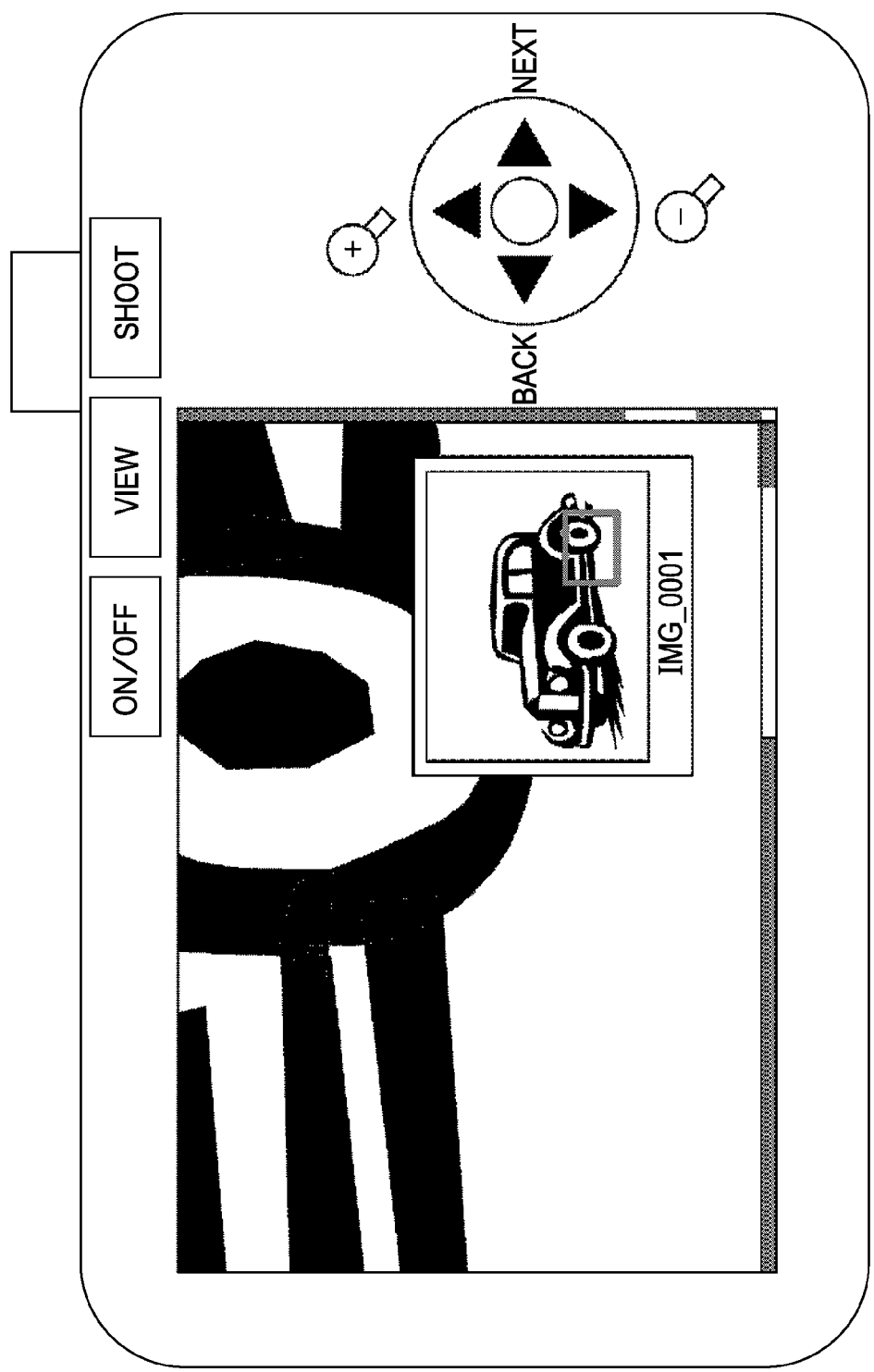
FIG. 18 is a display example of a user interface with the digital camera which is an example of the image display control apparatus according to the third embodiment.
Figure 19:
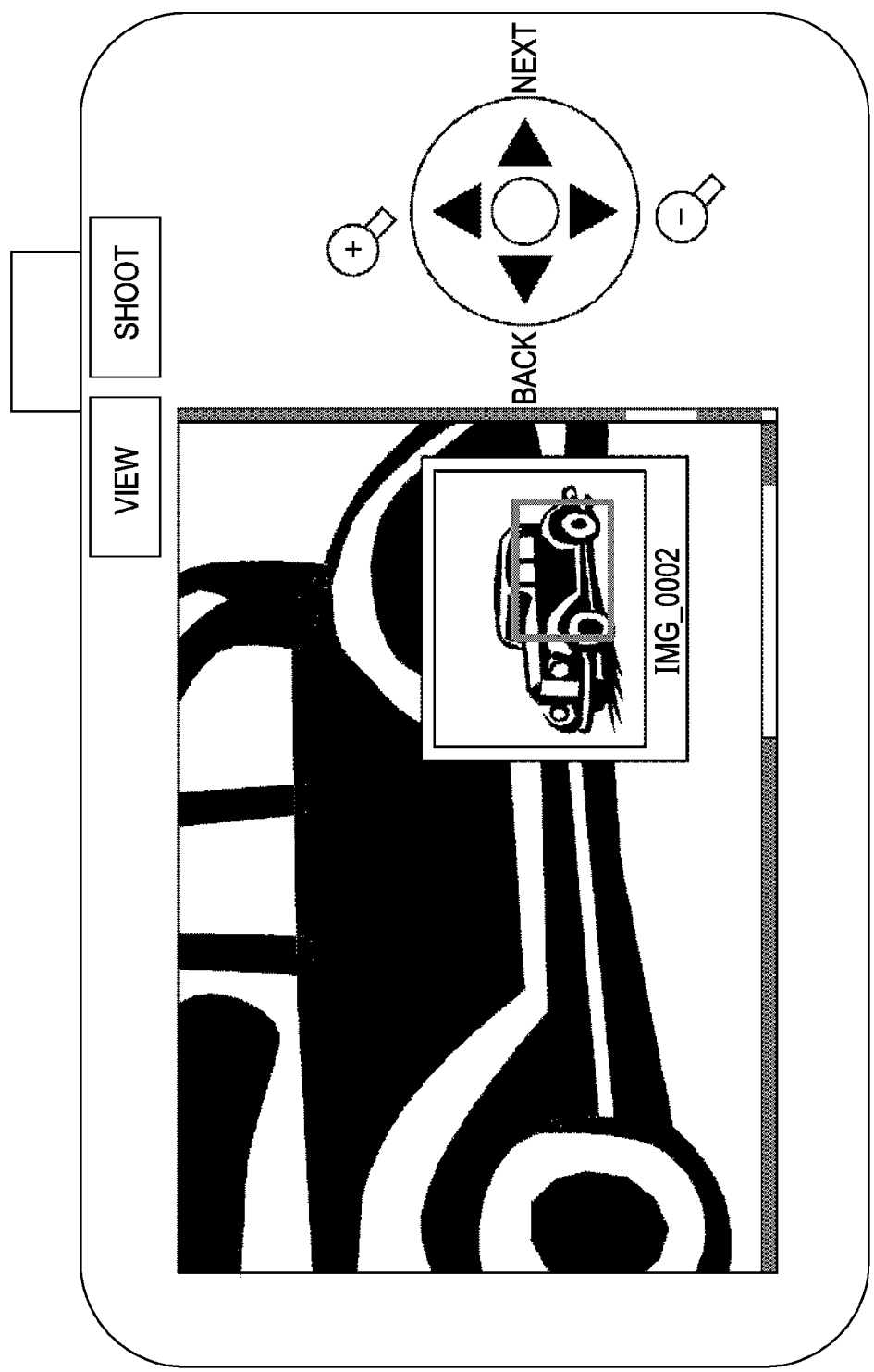
FIG. 19 is a display example of a user interface with the digital camera which is an example of the image display control apparatus according to the third embodiment.
Figure 20:
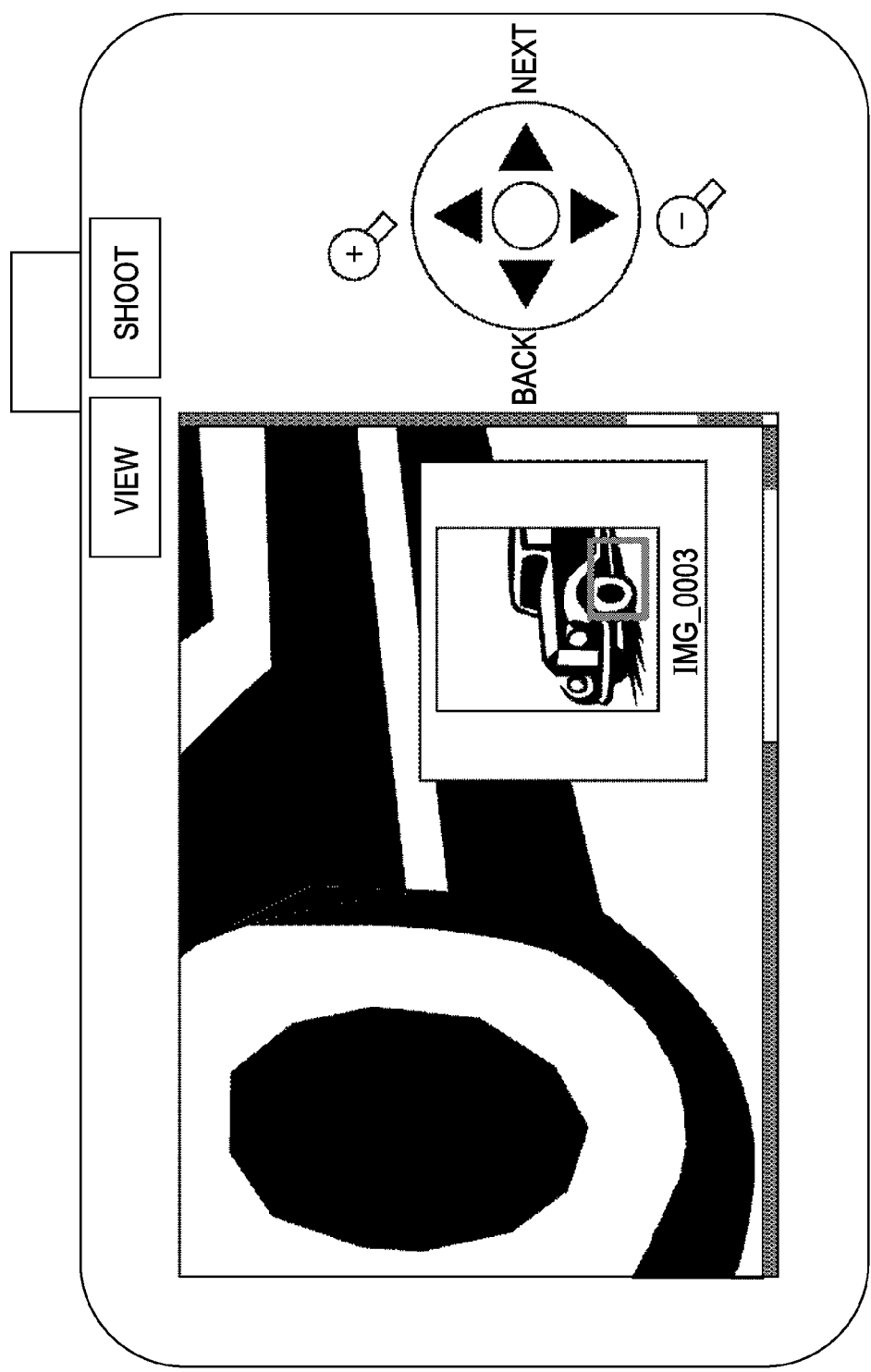
FIG. 20 is a display example of a user interface with the digital camera which is an example of the image display control apparatus according to the third embodiment.

With the third embodiment, a case will be described of carrying out the image display control method described with the first embodiment using a digital camera. FIG. 15 is a block diagram illustrating a schematic configuration of a digital camera serving as the image display control apparatus according to the present embodiment, and FIG. 16 is a diagram illustrating the rear face of the digital camera according to the present embodiment.

In FIG. 15, an image pick-up unit 1500 is for generating image data by taking images of a subject. A CPU 1501 is a control unit governing control of the entire main unit. ROM 1502 is a storage unit storing operation processing procedures for the CPU 1501 (e.g., programs such as for performing processing when turning the power of the digital camera on, basic input/output processing, etc.). RAM 1503 functions as main memory. The CPU 1501 loads various types of programs from the ROM 1502 to the RAM 1503, and executes. The RAM 1503 also provides a work area for the CPU 1501 to execute various types of processing.

The operating unit 1507 is an input apparatus, such as button or the like for accepting input from a user to the digital camera. Detailed description of buttons will be described later. A media drive 1508 is a recording media mounting unit, to which recording media such as memory cards or the like are mounted, so as to store data, and read out the stored data.

An interface 1509 is for connecting with an external device such as the computer 101 in FIG. 1 and so forth, and exchanging various types of data. A bus 1510 is a system bus (configured of an address bus, data bus, and control bus) of connecting between the above-described units.

The operating members in FIG. 16, and the user interface to be displayed on a display 1504 at the time of the view mode of the digital camera, will be described with correlation to FIG. 6. A power button 1609 turns the power for the digital camera on and off. In the event of turning the power off from an on state, display of images ends, in the same way as with the end button 607 in FIG. 6. A release button 1610 is a button which the user presses to take pictures. A view mode button 1602 is a button which the user presses for switching to a view mode for viewing image stored in the storage medium. A shoot mode button 1603 is a button which the user presses for switching from the view mode to a photography mode. A function switchover button 1608 is a button for switching the functions of an up button 1604, right button 1605, down button 1606, and left button 1607.

Displayed on the display 1504 are a preview area 1601, navigator 1611, frame 1612, horizontal direction scroll bar 1614, and vertical direction scroll bar 1615, which correspond to the preview area 609, navigator 612, frame 613, and scroll bars 616 and 617 in FIG. 6.

With the present embodiment, description will be made with the assumption that operation is performed by the up button 1604, right button 1605, down button 1606, and left button 1607, and that no operations are made on the display. Note that the user interface shown in FIG. 6 may be displayed on the display 1504 and operated with touch panel operations, as a matter of course.

We will say that the up button 1604 functions as the enlarge button 604, the down button 1606 functions as the reduce button 605, the right button 1605 functions as a button 615 for selecting the next image, and the left button 1607 functions as a button 614 for selecting the previous image. Pressing the function switchover button 1608 switches the functions of the up button 1604, right button 1605, down button 1606, and left button 1607, such that the up button 1604 functions as a button for scrolling upwards the display region of the displayed image which is enlarged, the down button 1606 functions as a button for scrolling downwards the display region of the displayed image which is enlarged, the left button 1607 functions as a button for scrolling to the left the display region of the displayed image which is enlarged, and the right button 1605 functions as a button for scrolling to the right the display region of the displayed image which is enlarged.

While the file read-in button 600 in FIG. 6 is not present in FIG. 16, with the present embodiment, in the event that readable images stored in a recording medium 111 are all selected as the object of processing, these are read into the RAM 1503. Also, the thumbnail area 603 in FIG. 6 is not displayed since switchover by selection of reduced images by clicking, such as described with FIG. 6, cannot be performed, but the thumbnail area 603 may be displayed as well. Also, the display scale can be changed with the up button 1604 and down button 1606, so no display scale specification box 606 or arrow button 607 such as described with FIG. 6 are shown, but these may be displayed as well. Providing such a user interface allows processing the same as with the image display control apparatus described with FIG. 5 in the first embodiment.

What sorts of displays are made on the digital camera in accordance with user operations with such a user interface, are shown in FIGS. 16 through 20. Note that the FIGS. 16 through 20 correspond to Cases 1 through 5 described with the first embodiment.

About Holding Relative Position Information

With the digital camera according to the third embodiment, whether to discard or to hold relative position information in accordance with operations or the state of the apparatus will be described. With the following situations 1 through 4, the relative position information is held in the ROM 1502 or RAM 1503.

1. The selection screen has changed.
2. The user has switched to the shoot mode and then returned to the view mode without shooting.
3. The power has automatically turned off due to power wave mode
4. The battery has run out and the power has automatically turned off.

The reason why the relative position information is held in these situations will be described. In the situation 1, at the time of displaying images one after another with the display scale fixed, a corresponding range can be displayed even for images of different sizes or images with different orientation, so comparison of images is easy. Accordingly, ratio information is held.

In the situation 2, in the event that the user has switched to the shoot mode and then returned to the view mode without shooting, there is the possibility that switching to the shoot mode was the result of an erroneous operation. In the event of switching to the shoot mode as the result of an erroneous operation and then returning to the view mode without shooting, it would be better to be able to return to the previous state in the view mode with fewer operations. Accordingly, in this case, information such as the selected image and scale are also held.

In the situation 3, the power may have shut off without the user intending. In the event that the power has shut off without the user intending, it would be better to be able to return to the previous state in the view mode with fewer operations, so ratio information is held, and further, information such as the selected image and scale are also held.

In the situation 4, the power may have shut off without the user intending. Due to the same reason as with the situation 3, ratio information is held, and further, information such as the selected image and scale are also held.

In the following situations 5 through 8, the relative position information is not held.
5. The user has changed the display range.
6. The user has switched to shoot mode and then taken a picture.
7. The recording medium has been removed.
8. The user has turned the power off.

The reason why the relative position information is not held in these situations will be described. In the situation 5, at the time of displaying images one after another after the user has changed the display range, the ratio information needs to be updated or the corresponding range following changing of the display range cannot be displayed, so the ratio is updated without holding the ratio.

In the situation 6, if the user has taken a picture and then returned the mode to the view mode, it is most likely that the user has returned to the view mode to view the image data that has been taken last, so the ratio is not held but cleared. In this case, it is desirable to have an arrangement wherein, at the time of switching to the view mode, the last-taken image is in a selected state, and displayed with a display scale whereby the entire image can be displayed.

In the situation 7, a different recording medium may be mounted next, which would mean that an entirely different image would be viewed in an enlarged manner holding the ratio, so the probability of an enlarged display completely unintentional for the user is high. Accordingly, the ratio is not held.

In the situation 8 if the user has turned the power off, this means that the probability that the camera will not be used for a while is high, and the recording medium may be replaced while off. Accordingly, due to the same reason as with the situation 7, the ratio is not held.

While a digital camera has been described as an example with the present embodiment, the same method can be applied to other devices having image display functions, such as digital video cameras, cellular phones, and so forth.

Thus, with the present embodiment, relative position information is discarded or held according to user operations or the state of the apparatus, whereby image display functions which the user desires can be provided with few operations.

Other Embodiments

With the first embodiment, description has been made that the coordinates p_furthest(fX, fY) of the corner of the display range the farthest from the center of the image are obtained, and the ratio (fX/Image_Width, fY/Image_Height) of the coordinates as to the entire image, and position information, are stored as relative position information. However the method for generating relative position information is not restricted to the calculation method in the first embodiment, as long as the relative position information fX/Image_Width and fY/Image_Height can be obtained. For example, as shown in FIG. 12A, the x-coordinates of the right side of the rectangle of the display range 1204 are all equal to fX. Now, the right side of the rectangle of the display range 1204 in FIG. 12A is a side or point of the display range in image A1 the farthest from the center of the entire image of image A1 in the horizontal direction. Accordingly, fX/Image_Width may be obtained for the relative position information by obtaining the x-coordinate of the side or point of the display range the farthest from the center of the entire image in the horizontal direction, instead of obtaining the coordinates of the corner of the display range the farthest from the center of the image. In the same way, as shown in FIG. 12A, the y-coordinates of the bottom side of the rectangle of the display range 1204 are all equal to fY, so fY/Image_Height may be obtained for the relative position information by obtaining the y-coordinate of the side or point of the display range the farthest from the center of the entire image in the vertical direction, instead of obtaining the coordinates of the corner of the display range the farthest from the center of the image.

Also, in the event that the display range is not a rectangle, but circular, a polygon other than a rectangle, or the like, it is desirable that the relative position information is generated taking as the reference point a point expressed by the x-coordinate on the display range the farthest in the horizontal direction from the center of the entire image and the y-coordinate on the display range the farthest in the vertical direction from the center of the entire image. This reference point will be the same as the farthest point from the center of the entire image on a rectangle circumscribing the display range. As described in FIGS. 12A through 12E, generating the relative position information with a point on a rectangle which is a partial range of the image that is the farthest from the center of the entire image allows the probability of the rectangle which is a partial range of the image from extending out form the image at the time of switching images. That is to say, generating the relative position information with a point on a rectangle circumscribing the display range that is the farthest from the center of the entire image allows the probability of the rectangle circumscribing the display range from extending out form the image at the time of switching images. Thus, the probability of the display range itself extending out from the image can also be reduced.

Also, in the event that there is at least one point in the display range within a predetermined threshold value from a point the farthest from the center of the entire image in the horizontal direction, the x-coordinate of the center (average) between the farthest point and the point within the threshold may be taken as the x-coordinate of the reference point for generating the relative position information. The particular threshold used should be a threshold value regarding which it can be said that the distance in the horizontal direction from the center of the entire image is around the same as the distance between the center of the entire image to the farthest point in the horizontal direction. In the same way, in the event that there is at least one point in the display range within a predetermined threshold value from a point the farthest from the center of the entire image in the vertical direction, the y-coordinate of the center (average) between the farthest point and the point within the threshold may be taken as the y-coordinate of the reference point for generating the relative position information. Generating relative position information based on a reference point obtained in this way, and switching images displayed in the display range based on this relative position information enables reduction in the sensation of offset such as the display ranges not corresponding at the time of switching images, in the same way as with the second embodiment.

Note that the reference point for generating the relative position information needs not be a point strictly determined by the above-described calculation methods. Anything is usable as long as, as a result of determining the display range based on the relative position information at the time of switching images with the display scale fixed, the corresponding range can be displayed in images before and after switching, and also the probability of the display range extending out from the entire image can be reduced. That is to say, even without or determining the reference point based on the center point or closest point of the display range image for generating relative position information, the advantages of the present invention can be expected by determining a reference point based on a point at an arbitrary position relatively far from the center of the entire image. In other words, the reference point for generating the relative position information may be determined based on an arbitrary point which is farther from the center of the entire image in the horizontal and/or vertical direction(s) than a point of the corners or center of the display range other than the point farthest from the center of the entire image in the horizontal and/or vertical direction(s).

Also, an arrangement may be made wherein the entire image is sectioned into four regions (first quadrant through fourth quadrant) on orthogonal coordinates with the center of the image as the point of origin, and the reference point is determined based on in which of the four regions (quadrants) the enter of the display range is situated. This is as follows, for example.

In the event that the center of the display range is situated in the first quadrant (upper right region), the upper right corner of the display range is taken as the reference.

In the event that the center of the display range is situated in the second quadrant (upper left region), the upper left corner of the display range is taken as the reference.

In the event that the center of the display range is situated in the third quadrant (lower left region), the lower left corner of the display range is taken as the reference.

In the event that the center of the display range is situated in the fourth quadrant (lower right region), the lower right corner of the display range is taken as the reference.

Note that in the above embodiments, the expression "farthest point in the display range of the image that is selected from the center of the entire image that is selected" can be rephrased as "closest point from a corner or side in the display range of the image that is selected" if referring to substantially the same point.

Also, while an example has been described of determining the display range based on the relative position information at the time of switching images in the first through third embodiments, but the present invention is also applicable in the event of displaying and comparing multiple images at the same time. That is to say, in the event that there are multiple display ranges, and different images are to be displayed on these display ranges at the same time with the same display scale, an arrangement may be made wherein relative position information is generated from one particular image, and the display ranges of the other images are determined based on the generated relative position information.

The features of the present embodiment can be realized by provided a recording medium storing the program code of software manifesting the functions of the above-described embodiments to a system or apparatus. A computer (or CPU or MPU) of the system or apparatus can read and execute the program code stored in the recording medium, thereby realizing the functions of the above-described embodiments. In this case, the program code read out from the recording medium itself realizes the functions of the embodiments, and the recording medium storing the program code makes up the present invention. Examples of recording media for supplying such program code include magnetic disks such as floppy disks and hard disks, optical disks such as CD-ROM and CD-R, magneto-optical disks, magnetic tape, non-volatile memory cards, ROM, and so forth.

The present invention is not restricted to a computer executing the program code that has been read out to realize the functions of the above-described embodiments. Cases wherein an OS (Operating System) running on the computer performs part or all of the actual processing based on instructions of the program code, and the functions of the above-described embodiments are realized by that processing, are also encompassed in the present invention.

Further, case wherein the program code read out form the recording medium is written to memory provided to a function expansion board inserted into the computer or a function expansion unit connected to the computer, and a CPU or the like provided to the function expansion board or function expansion unit performs part or all of the actual processing based on instructions of the program code, and the functions of the above-described embodiments are realized by that processing, are also encompassed in the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-231499 filed Sep. 6, 2007, which is hereby incorporated by reference herein in its entirety.

What is claimed is:

1. An image display control apparatus comprising:
a display control unit configured to display a part of an entire image on a display region on a display apparatus;
a switching unit configured to switch a part of an entire image displayed in the display region from a part of an entire first image to a part of an entire second image, the entire first image and the entire second image having a different number of recording pixels, with a display scale which is a ratio of a number of recording pixels of an entire image and a number of pixels on the display apparatus available for displaying the entire image is fixed;
a reference point determining unit configured to determine, from the part of the entire first image displayed in the display region, a reference point, based on a side or point farthest from a center of the entire first image in a horizontal direction, and a side or point farthest from the center of the entire first image in a vertical direction, even when the point farthest from the center of the entire first image in a part of the entire first image displayed in the display region is not a point of an upper left of the part of the entire first image;
a storage control unit configured to affect control such that relative position information indicating a relative position of the reference point as to the entire first image is stored; and
a display part determining unit configured to determine the part of an entire second image displayed in the display region, such that a relative position of a point in a part of an entire second image displayed in the display region which corresponds to the reference point in the first entire image, as to the entire second image, is of a relative position which the relative position information indicates.

2. The image display control apparatus according to claim 1, wherein the relative position information is a ratio of the reference point as to the entire first image.

3. The image display control apparatus according to claim 1, wherein, in an event that the display region is a rectangle, the display part determining unit takes, from the part displayed in the display region in the entire first image, as the side or point farthest from the center of the entire first image in the horizontal direction and a side or point farthest from the center of the entire first image in the vertical direction, a point based on the point in the part displayed in the display region in the entire first image that is the farthest from the center of the entire first image, as the reference point.

4. The image display control apparatus according to claim 3, wherein, in an event that there is at least one corner of a range displayed in the display region which is a corner other than a corner farthest from the center of the entire first image, and which is a corner regarding which a distance from the center of the entire first image to the corner and a distance to the point farthest from the center of the entire first image are within a predetermined threshold value, the display part determining unit determines a center point between the farthest point and the corner within the particular threshold value as the reference point.

5. The image display control apparatus according to claim 3, wherein the display part determining unit determines the point in the part displayed in the display region in the entire first image which is the farthest from the center of the entire first image, as the reference point.

6. The image display control apparatus according to claim 1, wherein the display control unit affects control to display a correlation between the entire image to be displayed in the display region, and the part displayed in the display region.

7. The image display control apparatus according to claim 1, wherein the storage control unit affects control to hold the relative position information until the part of the entire image displayed in the display region is changed.

8. The image display control apparatus according to claim 1, further comprising a display scale specification unit configured to accept user instructions regarding the display scale.

9. The image display control apparatus according to claim 1, wherein the image display control apparatus is an image pick-up apparatus.

10. An image display control apparatus comprising:
a display control unit configured to display a part of an entire image on a display region on a display apparatus;
a switching unit configured to switch a part of an entire image displayed in the display region from a part of an entire first image to a part of an entire second image, the entire first image and the entire second image having a different number of recording pixels, with a display scale which is a ratio of a number of recording pixels of an entire image and a number of pixels on the display apparatus used for displaying the entire image is fixed;
a storage unit configured to store, with regard to a point from a part of the entire first image displayed in the display region which is farthest from a center of the entire first image, relative position information indicating a relative position of a reference point as to the first image, even when the point farthest from the center of the entire first image in a part of the entire first image displayed in the display region is not a point of an upper left of the part of the entire first image; and
a display part determining unit configured to determine the part of an entire second image displayed in the display region, such that a relative position of a point in a part of an entire second image displayed in the display region which corresponds to a point in the entire first image indicated by the relative position information, as to the entire second image, is of a relative position which the relative position information indicates.

11. An image display control apparatus comprising:
a display control unit configured to display a part of an entire image on a display region on a display apparatus;
a changing unit configured to change a part of the entire image; and
a switching unit configured to switch a part of an entire image displayed in the display region from a part of an entire first image to a part of an entire second image, the entire first image and the entire second image having a different number of recording pixels, with a display scale which is a ratio of a number of recording pixels of an entire image and a number of pixels on the display apparatus used for displaying the entire image is fixed,
wherein, in an event of switching the entire image to be displayed from the entire first image to the entire second image by the switching unit, the display control unit controls display such that a relative position of a point in a part displayed in the display region of the entire first image that is farthest from a center of the entire first image, as to the entire first image, and a relative position of a point in a part displayed in the display region of the entire second image corresponding to the point that is farthest from the center of the entire first image, as to the entire second image, are equal, even when the point farthest from the center of the entire first image in a part of the entire first image displayed in the display region is not a point of an upper left of the part of the entire first image.

12. An image display control apparatus comprising:
a display control unit configured to display a part of an entire image on a display region on a display apparatus;
a switching unit configured to switch a part of an entire image displayed in the display region from a part of an entire first image to a part of an entire second image, the entire first image and the entire second image having a different number of recording pixels, with a display scale which is a ratio of a number of recording pixels of an entire image and a number of pixels on the display apparatus used for displaying the entire image is fixed;
a storage unit configured to determine a reference point based on a portion in the entire first image which is farther from a center of the entire first image in a horizontal direction than a point other than a corner or center portion of a part displayed in the display region in the entire first image that is the farthest from the center of the entire first image in the horizontal direction, and a portion in the entire first image which is farther from a center of the entire first image in a vertical direction than a point other than a corner or center portion of a part displayed in the display region in the entire first image that is the farthest from the center of the entire first image in the vertical direction, even when the point farthest from the center of the entire first image in a part of the entire first image displayed in the display region is not a point of an upper left of the part of the entire first image, and store relative position information indicating the relative position of the reference point as to the entire first image; and
a display part determining unit configured to determine the part of an entire second image displayed in the display region, such that the relative position of a point in a part of an entire second image displayed in the display region, corresponding to the reference point which the relative position information indicates, as to the entire second image, is a relative position indicated by the relative position information.

13. An image display control method comprising:
displaying a part of an entire image on a display region on a display apparatus;
switching a part of an entire image displayed in the display region from a part of an entire first image to a part of an entire second image, the entire first image and the entire second image having a different number of recording pixels, with a display scale which is a ratio of a number of recording pixels of an entire image and a number of pixels on the display apparatus available for displaying the entire image is fixed;
determining, from the part of the entire first image displayed in the display region, a reference point, based on a side or point farthest from a center of the entire first image in a horizontal direction, and a side or point farthest from the center of the entire first image in a vertical direction, even when the point farthest from the center of the entire first image in a part of the entire first image displayed in the display region is not a point of an upper left of the part of the entire first image;
affecting control such that relative position information indicating a relative position of the reference point as to the entire first image is stored; and
determining the part of an entire second image displayed in the display region, such that a relative position of a point in a part of an entire second image displayed in the display region which corresponds to the reference point in the first entire image, as to the entire second image, is of a relative position which the relative position information indicates.

14. An image display control method comprising:
  displaying a part of an entire image on a display region on a display apparatus;
  switching a part of an entire image displayed in the display region from a part of an entire first image to a part of an entire second image, the entire first image and the entire second image having a different number of recording pixels, with a display scale which is a ratio of a number of recording pixels of an entire image and a number of pixels on the display apparatus used for displaying the entire image is fixed;
  storing, with regard to a point from a part of the entire first image displayed in the display region which is farthest from a center of the entire first image, relative position information indicating a relative position of a reference point as to the entire first image, even when the point farthest from the center of the entire first image in a part of the entire first image displayed in the display region is not a point of an upper left of the part of the entire first image; and
  determining the part of an entire second image displayed in the display region, such that a relative position of a point in a part of an entire second image displayed in the display region which corresponds to a point in the entire first image indicated by the relative position information, as to the entire second image, is of a relative position which the relative position information indicates.

15. An image display control method comprising:
  displaying a part of an entire image on a display region on a display apparatus;
  changing a part of the entire image; and
  switching a part of an entire image displayed in the display region from a part of an entire first image to a part of an entire second image, the entire first image and the entire second image having a different number of recording pixels, with a display scale which is a ratio of a number of recording pixels of an entire image and a number of pixels on the display apparatus used for displaying the entire image is fixed,
  wherein, in an event of switching the entire image to be displayed from the entire first image to the entire second image, controlling display such that a relative position of a point in a part displayed in the display region of the entire first image that is farthest from a center of the entire first image, as to the entire first image, and a relative position of a point in a part displayed in the display region of the entire second image corresponding to the point that is farthest from the center of the entire first image, as to the entire second image, are equal, even when the point farthest from the center of the entire first image in a part of the entire first image displayed in the display region is not a point of an upper left of the part of the entire first image.

16. An image display control method comprising:
  displaying a part of an entire image on a display region on a display apparatus;
  switching a part of an entire image displayed in the display region from a part of an entire first image to a part of an entire second image, the entire first image and the entire second image having a different number of recording pixels, with a display scale which is a ratio of a number of recording pixels of an entire image and a number of pixels on the display apparatus used for displaying the entire image is fixed;
  determining a reference point based on a portion in the entire first image which is farther from a center of the entire first image in a horizontal direction than a point other than a corner or center portion of a part displayed in the display region in the entire first image that is the farthest from the center of the entire first image in the horizontal direction, and a portion in the entire first image which is farther from a center of the entire first image in a vertical direction than a point other than a corner or center portion of a part displayed in the display region in the entire first image that is the farthest from the center of the entire first image in the vertical direction, even when the point farthest from the center of the entire first image in a part of the entire first image displayed in the display region is not a point of an upper left of the part of the entire first image, and storing relative position information indicating the relative position of the reference point as to the entire first image; and
  determining the part of an entire second image displayed in the display region, such that the relative position of a point in a part of an entire second image displayed in the display region, corresponding to the reference point which the relative position information indicates, as to the entire second image, is a relative position indicated by the relative position information.

17. A non-transitory computer-readable storage medium storing a program that causes an image display control apparatus to perform the method according to claim 13.

18. A non-transitory computer-readable storage medium storing a program that causes an image display control apparatus to perform the method according to claim 14.

19. A non-transitory computer-readable storage medium storing a program that causes an image display control apparatus to perform the method according to claim 15.

20. A non-transitory computer-readable storage medium storing a program that causes an image display control apparatus to perform the method according to claim 16.

* * * * *